(12) United States Patent  
Kawaguchi

(10) Patent No.: US 8,166,232 B2  
(45) Date of Patent: Apr. 24, 2012

(54) METRICS AND MANAGEMENT FOR FLASH MEMORY STORAGE LIFE

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 463 days.

(21) Appl. No.: 12/385,232

(22) Filed: Apr. 2, 2009

(65) Prior Publication Data

US 2010/0257306 A1 Oct. 7, 2010

(51) Int. Cl.
*G06F 12/02* (2006.01)
*G06F 12/00* (2006.01)

(52) U.S. Cl. ............ 711/103; 711/114; 711/E12.001; 711/E12.008

(58) Field of Classification Search ............ 711/103, 711/112, 114, E12.001, E12.008
See application file for complete search history.

(56) References Cited

U.S. PATENT DOCUMENTS

| 5,682,396 A | 10/1997 | Yamamoto et al. | |
| 2009/0249018 A1* | 10/2009 | Nojima et al. | 711/170 |
| 2010/0005228 A1* | 1/2010 | Fukutomi et al. | 711/103 |

OTHER PUBLICATIONS

Sandisk Corporation, "Longterm Data Endurance (LDE) for Client SSD", SanDisk White Paper, Oct. 31, 2008.

* cited by examiner

*Primary Examiner* — Hoai V Ho  
*Assistant Examiner* — Tri Hoang  
(74) *Attorney, Agent, or Firm* — Mattingly & Malur, P.C.

(57) ABSTRACT

Embodiments of the invention provide a method and a system for the management of availability and reliability of flash memory media. In one embodiment, a method of evaluating reliability of flash memory media comprises measuring a flash memory remaining life for each disk of a plurality of flash memory media disks provided in one or more flash memory media groups each of which has a configuration, wherein each flash memory media group is one of a RAID group or a thin provisioning pool; obtaining a ratio of sequential to random write I/O types for each flash memory media group; and calculating a remaining life of each flash memory media group based on the measured flash memory remaining life for each disk in said each flash memory media group, the configuration of said each flash memory media group, and the ratio of sequential to random write I/O types for said each flash memory media group.

20 Claims, 45 Drawing Sheets

| RAID Gr. # | RAID Lv. | Disk# | Capacity |
|---|---|---|---|
| 0 | 5 | 0-7 | 1200[GB] |
| 1 | 5 | 8-15 | 1200[GB] |
| 2 | 10 | 16-19 | 1200[GB] |
| 3 | NULL | NULL | 0[GB] |
| 4 | NULL | NULL | 0[GB] |
| 5 | NULL | NULL | 0[GB] |
| 6 | 6 | 64-71 | 2400[GB] |
| 7 | 6 | 80-87 | 2400[GB] |

RAID Group Management Table

Fig. 3

| Vol# | Capacity | RAID Gr. # | Top Address | Sequential Write | Random Write |
|---|---|---|---|---|---|
| 0 | 100[GB] | 1 | 0x00000000 | 21878 | 1139 |
| 1 | 300[GB] | 0 | 0x00000000 | 73 | 2631 |
| 2 | 200[GB] | 1 | 0x10000000 | 13983 | 42987 |
| 3 | 600[GB] | 7 | 0x00000000 | 73171 | 29849 |
| 4 | N/A | N/A | N/A | N/A | N/A |
| 5 | 600[GB] | 2 | 0x00000000 | 8181 | 19832 |
| 6 | N/A | N/A | N/A | N/A | N/A |
| 7 | N/A | N/A | N/A | N/A | N/A |

Virtual Volume Management Table

| Disk# | Capacity |
|---|---|
| 0 | 144[GB] |
| 1 | 144[GB] |
| 2 | 144[GB] |
| 3 | 144[GB] |
| 4 | 72[GB] |
| 5 | 72[GB] |
| 6 | 72[GB] |
| 7 | 72[GB] |

112-11-3-1  112-11-3-2

Disk Management Table

Cache Management Table 112-14

| Index 112-14-1 | Virtual Volume# 112-14-2 | LBA 112-14-3 | Next 112-14-4 |
|---|---|---|---|
| 0 | 2 | 0xA00 | 1 |
| 1 | 1 | 0x7E000 | 2 |
| 2 | 1 | 0x9700 | 3 |
| 3 | 0 | 0x0000 | NULL |
| 4 | 2 | 0xC500 | 5 |
| 5 | 1 | 0x1100 | 6 |
| 6 | 1 | 0xFF00 | NULL |

| Kind of Queue 112-14-5 | Pointer 112-14-6 |
|---|---|
| Free | 2 |
| Clean | 1 |
| Dirty | 4 |

Fig. 20

$$E = \rho E_{p/Seq.} + (1-\rho) E_{p/Rnd.}$$
E100

$$\left\{\begin{array}{l} E_{RAID10/Seq.} = \dfrac{N}{2}\min(\lambda_{i=[0,N-1]}) \\ \quad\quad\quad\quad\quad\text{E101} \\ E_{RAID10/Rnd.} = \dfrac{N}{2}\min(\lambda_{i=[0,N-1]}) \\ \quad\quad\quad\quad\quad\text{E101} \\ E_{RAID5/Seq.} = (N-1)\min(\lambda_{i=[0,N-1]}) \\ \quad\quad\quad\quad\quad\text{E102} \\ E_{RAID5/Rnd.} = \dfrac{N}{2}\min(\lambda_{i=[0,N-1]}) \\ \quad\quad\quad\quad\quad\text{E103} \\ E_{RAID6/Seq.} = (N-2)\min(\lambda_{i=[0,N-1]}) \\ \quad\quad\quad\quad\quad\text{E104} \\ E_{RAID6/Rnd.} = \dfrac{N}{3}\min(\lambda_{i=[0,N-1]}) \\ \quad\quad\quad\quad\quad\text{E105} \end{array}\right.$$

- V100 — $E$: Write I/O Endurance of the group
- V101 — $p$: RAID Level of the group
- V102 — $q$: Write I/O type. (Seq.: Sequential, Rnd.: Random)
- V103 — $E_{p/q}$: Write I/O Endurance of the RAID group in condition $p$ and $q$.
- V104 — $i$: ID of a Disk ($i$: integer, $0 \leq i \leq N-1$)
- V105 — $N$: Number of Disks in the RAID group
- V106 — $\lambda_i$: Remaining life of Disk $i$
- V107 — $\rho$: Ratio of sequential write I/O ($0 \leq \rho \leq 1$)

| Disk# | Capacity | Life | Life Counter |
|---|---|---|---|
| 0 | 144[GB] | 1000000 | 234 |
| 1 | 144[GB] | 1000000 | 2522 |
| 2 | 144[GB] | 1000000 | 3243 |
| 3 | 144[GB] | 1000000 | 16437 |
| 4 | 72[GB] | 100000 | 3364 |
| 5 | 72[GB] | 100000 | 2324 |
| 6 | 72[GB] | 100000 | 78724 |
| 7 | 72[GB] | 100000 | 4243 |

Disk Management Table

$$\left. \begin{array}{l} E_{\text{RAID10/Seq.}} = \dfrac{N}{2}\min(\lambda_{i=[0,N-1]}) \\[4pt] E_{\text{RAID10/Rnd.}} = \dfrac{N}{2}\min(\lambda_{i=[0,N-1]}) \\[4pt] E_{\text{RAID5/Seq.}} = (N-1)\min(\lambda_{i=[0,N-1]}) \\[4pt] E_{\text{RAID5/Rnd.}} = \dfrac{N}{2}\min(\lambda_{i=[0,N-1]}) \\[4pt] E_{\text{RAID6/Seq.}} = (N-2)\min(\lambda_{i=[0,N-1]}) \\[4pt] E_{\text{RAID6/Rnd.}} = \dfrac{N}{3}\min(\lambda_{i=[0,N-1]}) \end{array} \right.$$

E101, E102, E103, E104, E105

$$E = \rho E_{p/Seq.} + (1-\rho) E_{p/Rnd.}$$

E100

- $E$ : Write I/O Endurance of the group (v100)
- $p$ : RAID Level of the group (v101)
- $q$ : Write I/O type. (Seq.: Sequential, Rnd.: Random) (v102)
- $E_{p/q}$ : Write I/O Endurance of the RAID group in condition $p$ and $q$ (v103)
- $i$ : ID of a Disk ($i$: integer, $0 \leq i \leq N-1$) (v104)
- $N$ : Number of Disks in the RAID group (v105)
- $\rho$ : Ratio of sequential write I/O ($0 \leq \rho \leq 1$) (v106)
- $L_i$ : Theoretical limit of write number of time to Disk $i$ (v108)
- $l_i$ : Write number of times to Disk $i$ (v109)
- $\lambda_i = L_i - l_i$ (v107)

| RAID Gr. # | RAID Lv. | Disk# | Capacity | Free Chunk Queue Index | Used Chunk Queue Index |
|---|---|---|---|---|---|
| 0 | 5 | 0-7 | 1200[GB] | 1 | 8 |
| 1 | 5 | 8-15 | 1200[GB] | 7 | 15 |
| 2 | 5 | 16-23 | 1200[GB] | 2 | 3 |
| 3 | NULL | NULL | 0[GB] | NULL | NULL |
| 4 | NULL | NULL | 0[GB] | NULL | NULL |
| 5 | NULL | NULL | 0[GB] | NULL | NULL |
| 6 | 10 | 64-71 | 2400[GB] | 31 | 22 |
| 7 | 10 | 80-87 | 2400[GB] | 14 | 8 |

RAID Group Management Table

Fig. 28

| | 112-11-2-1 | 112-11-2-2 | 112-11-2-3' | 112-11-2-5' | 112-11-2-6 | 112-11-2-7 |
|---|---|---|---|---|---|---|
| 112-11-2 | Vol# | Capacity | RAID Gr. # | Chunk# | Sequential Write | Random Write |
| | 0 | 100[GB] | 1 | 23 | 21878 | 1139 |
| | 1 | 300[GB] | 0 | 11 | 73 | 2631 |
| | 2 | 200[GB] | 1 | 71 | 13983 | 42987 |
| | 3 | 600[GB] | 7 | 3 | 73171 | 29849 |
| | 4 | N/A | N/A | N/A | N/A | N/A |
| | 5 | 600[GB] | 2 | 1 | 8181 | 19832 |
| | 6 | N/A | N/A | N/A | N/A | N/A |
| | 7 | N/A | N/A | N/A | N/A | N/A |

Volume Management Table

Fig. 29

| Top LBA Addr. of Virtual Vol. Page | RAID Gr. # | Top LBA Addr. of Capacity Pool Page |
|---|---|---|
| 0x0000 | 10 | 0x4000 |
| 0x0100 | 14 | 0x0200 |
| 0x0200 | 18 | 0x0000 |
| 0x0300 | N/A | N/A |
| 0x0400 | 10 | 0x3200 |
| 0x0500 | 18 | 0x0200 |
| 0x0600 | 10 | 0x1000 |

Virtual Volume Page Management Table 112-15-1

Capacity Pool Chunk Management Table 112-15-2

| Capacity Pool Chunk# | Virtual Volume# | Used Capacity | Deleted Capacity | Last Chunk Pointer | Next Chunk Pointer |
|---|---|---|---|---|---|
| 0 | 2 | 0 | 0kB | 7 | 2 |
| 1 | 10 | 2048kB | 1024kB | 2 | 3 |
| 2 | 5 | 8192kB | 768kB | 0 | 1 |
| 3 | 7 | 4096kB | 0kB | 1 | Null |
| 4 | N/A | 0 | 0 | 21 | 31 |

112-15-2-1  112-15-2-2  112-15-2-3  112-15-2-4  112-15-2-5  112-15-2-6

| Capacity Pool Page Index | Virtual Volume Page# |
|---|---|
| 0 | 10 |
| 1 | 27 |
| 2 | NULL |
| 3 | 13 |

112-15-3-1 | 112-15-3-2

112-15-3 Capacity Pool Page Management Table

Fig. 32

$$E_{\text{Thin Prov.}} = \sum_{j=0}^{M-1} E_j$$

E200

V200 — $E_{\text{Thin Prov.}}$ : Write I/O Endurance of the Thin Provisioning Pool
V201 — $E_j$ : Write I/O Endurance of the RAID group $j$
V202 — $j$ : ID of a RAID Group ($0 \leq j \leq M\text{-}1$)
V203 — $M$ : Number of RAID groups

| Disk# | Capacity | Free Chunk Queue Index | Used Chunk Queue Index |
|---|---|---|---|
| 0 | 300[GB] | 1 | 8 |
| 1 | 300[GB] | 7 | 15 |
| 2 | 300[GB] | 2 | 3 |
| 3 | 0[GB] | NULL | NULL |
| 4 | 0[GB] | NULL | NULL |
| 5 | 0[GB] | NULL | NULL |
| 6 | 500[GB] | 31 | 22 |
| 7 | 500[GB] | 14 | 8 |

Disk Management Table

Virtual Volume Management Table

| Vol# | Capacity | Disk# | Chunk# |
|---|---|---|---|
| 0 | 100[GB] | 0 | 11 |
| 1 | 100[GB] | 1 | 54 |
| 2 | 300[GB] | 2 | 23 |
|   |         | 3 | 7  |
| 3 | 100[GB] | 0 | 1  |
|   |         | 5 | 67 |
|   |         | 10| 2  |
| 4 | 200[GB] | 3 | 65 |
|   |         | 4 | 71 |
|   |         | 1 | 82 |
| 5 | 600[GB] | 6 | 25 |
|   |         | 3 | 76 |
| 6 | 600[GB] | 4 | 91 |
|   |         | 5 | 3  |
| 7 | 300[GB] | 2 | 94 |
|   |         | 3 | 12 |

112-11-2': Vol# column 112-11-2-1
Capacity column 112-11-2-2
Disk# column 112-11-2-3''
Chunk# column 112-11-2-4''

Fig. 42

| Top LBA Addr. of Virtual Vol. Page | Disk# | Top LBA Addr. of Capacity Pool Page |
|---|---|---|
| 0x0000 | 0 | 0x4000 |
| | 1 | 0x0200 |
| | 2 | 0x0400 |
| 0x0100 | 3 | 0x0600 |
| | 4 | 0x0200 |
| | 1 | 0x0200 |
| 0x0200 | 6 | 0x1000 |
| | 3 | 0x0000 |
| 0x0300 | 0 | 0x0000 |
| | 5 | 0x0000 |
| 0x0400 | 2 | 0x0200 |
| | 7 | 0x1400 |
| 0x0500 | N/A | N/A |
| 0x0600 | N/A | N/A |
| 0x0700 | N/A | N/A |
| | N/A | N/A |

112-15-1-1' ... 112-15-1-2' ... 112-15-1-3'

Virtual Volume Page Management Table 112-15-1'

$$E_{\text{Thin Prov.}} = \frac{1}{2} \sum_{i=1}^{P} (\lambda_i)$$

E210

$E_{\text{Thin Prov.}}$ : Write I/O Endurance of the Thin Provisioning Pool — V200
$i$ : ID of a Disk — V201
$P$ : Number of Disks in the Thin Provisioning Pool — V212
$\lambda_i$ : Remaining life of Disk $i$ — V106

Fig. 45

METRICS AND MANAGEMENT FOR FLASH MEMORY STORAGE LIFE

BACKGROUND OF THE INVENTION

The present invention relates generally to a method and a system for the management of availability and reliability of flash memory media.

For flash memory media, examples of metrics for life time include MTBF (Mean Time Between Failures), MTTF (Mean Time To Failure), and LDE (Long-term Data Endurance). MTBF is a general metric for HDD availability/reliability, and represents a statistic HDD life time. MTTF is a general metric for RAID group availability, and it represents a statistic RAID group life time. LDE is a metric that represents how much capacity the media can be written. An example of storage control for high availability/reliability is RAID (Redundant Array of Independent Disks). RAID 10 has 4 or more disks and stores double data. RAID 5 has 3 or more disks and stores data and parity data. The parity data is generated from the data. This optimized control method is described in U.S. Pat. No. 5,682,396. RAID 6 has 4 or more disks and stores data and double-parity data. The double-parity data are generated from the data.

Generally, the life of an HDD (Hard Disk Drive) is dominated by its running time, because an HDD medium has mechanical units (heads, platters and motors). However, the life of a flash memory medium is dominated by the number of times it is written (erase operation) since, when the erase operation occurs, the flash memory medium applies a high voltage to reset the data. This erase operation can cause damage. Meanwhile especially in the enterprise environment, the use of flash memory media for storage systems is required for its high transaction and throughput performance. It is important for these environments that the use of flash memory media not to be stopped due to failure.

BRIEF SUMMARY OF THE INVENTION

Exemplary embodiments of the invention provide a method and a system for the management of availability and reliability of flash memory media and, more particularly, a way to predict flash memory failure caused by the erase operation and to protect against such failure. In one embodiment, the storage system manages the configurations of flash memory media groups (RAID group or thin provisioning pools), measures the flash memory remaining life of each disk of the flash memory media by counting the erase (write) operation number of times or getting the information from the flash memory media, measures the each ratio of write I/O types (sequential/random), calculates the remaining life of each of the flash memory media groups by using the remaining life of flash memory media, the configuration of the flash memory media groups (redundancy characteristics), and the ratio of write I/O types, and reports the calculated remaining life time of the flash memory media groups. The flash memory media units are referred to as disks for convenience. The term "disk" is not intended to limit the physical structure of the flash memory media unit, but encompasses any flash memory configuration.

In accordance with an aspect of the present invention, a method of evaluating reliability of flash memory media comprises measuring a flash memory remaining life for each disk of a plurality of flash memory media disks provided in one or more flash memory media groups each of which has a configuration, wherein each flash memory media group is one of a RAID group or a thin provisioning pool; obtaining a ratio of sequential to random write I/O types for each flash memory media group; and calculating a remaining life of each flash memory media group based on the measured flash memory remaining life for each disk in said each flash memory media group, the configuration of said each flash memory media group, and the ratio of sequential to random write I/O types for said each flash memory media group.

In some embodiments, measuring the flash memory remaining life for a disk comprises one of counting a number of sequential write operations and a number of random write operations to the disk or obtaining the flash memory remaining life from a sequential write counter and a random write counter in the disk.

In some embodiments, measuring the flash memory remaining life for a disk comprises obtaining the flash memory remaining life from a sequential write counter and a random write counter in the disk. The calculating comprises calculating the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/seq}$ is a write I/O endurance of the RAID group at RAID level p in sequential write I/O type,
$E_{p/Rnd}$ is a write I/O endurance of the RAID group at RAID level p in random write I/O type,
i is an ID of a disk and i is an integer, $0 \leq i \leq N-1$,
N is a number of disks in the RAID group,
$\lambda_i$ is a remaining life of disk i, and
$\rho$ is a ratio of sequential to random write I/O type, $0 \leq p \leq 1$.

In specific embodiments, the plurality of flash memory media disks are provided in one or more thin provisioning pools each having a plurality of RAID groups of disks. The calculating comprises calculating the remaining life of each thin provisioning pool $E_{Thin\ Prov}$ as follows $$E_{Thin\ Prov} = \Sigma^{M-1}_{j=0} E_j$$

where
j is an ID of a RAID group of disks in the thin provisioning pool,
$E_j$ is a remaining life of the RAID group j using $E = \rho E_{p/Seq} + (1-\rho) E_{p/Rnd}$, and
M is the number of RAID groups in the thin provisioning pool.

In some embodiments, the measuring the flash memory remaining life for a disk comprises counting a number of sequential write operations and a number of random write operations to the disk. The calculating comprises calculating the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group in sequential write I/O type,
$E_{p/Rnd}$ is a write I/O endurance of the RAID group in random write I/O type,
i is an ID of a disk and i is an integer, $0 \leq i \leq N-1$,
N is a number of disks in the RAID group,
$\rho$ is a ratio of sequential to random write I/O type, $0 \leq \rho \leq 1$,
$\lambda_i$ is a remaining life of disk i, and $\lambda_i \equiv L_i - I_i$,
$L_i$ is a theoretical limit of a number of write times to disk i, and
$I_i$ is one of the number of sequential write operations for disk i to be used for calculating the write I/O endurance in sequential write I/O type, or the number of random write operations for disk i to be used for calculating the write I/O endurance in random write I/O type.

In some embodiments, the plurality of flash memory media disks are provided in one or more thin provisioning pools each having a plurality of disks. The calculating comprises calculating the remaining life of the thin provisioning pool $E_{Thin\ Prov}$ as follows $$E_{Thin\ Prov} = (1/2) \Sigma^P_{i=1} (\lambda_i)$$

where
i is an ID of a disk,
$\lambda_i$ is a remaining life of disk i, and
P is the number of disks in the thin provisioning pool.

In accordance with another aspect of the invention, a system of evaluating reliability of flash memory media comprises a plurality of flash memory media disks which are provided in one or more flash memory media groups each of which has a configuration, wherein each flash memory media group is one of a RAID group or a thin provisioning pool; a memory storing data and one or more modules; a processor executing the one or more modules to measure a flash memory remaining life for each disk of the plurality of flash memory media disks; obtain a ratio of sequential to random write I/O types for each flash memory media group; and calculate a remaining life of each flash memory media group based on the measured flash memory remaining life for each disk in said each flash memory media group, the configuration of said each flash memory media group, and the ratio of sequential to random write I/O types for said each flash memory media group.

Another aspect of the invention is directed to a computer-readable storage medium storing a plurality of instructions for controlling a data processor to evaluate reliability of flash memory media. The plurality of instructions comprises instructions that cause the data processor to measure a flash memory remaining life for each disk of a plurality of flash memory media disks provided in one or more flash memory media groups each of which has a configuration, wherein each flash memory media group is one of a RAID group or a thin provisioning pool; instructions that cause the data processor to obtain a ratio of sequential to random write I/O types for each flash memory media group; and instructions that cause the data processor to calculate a remaining life of each flash memory media group based on the measured flash memory remaining life for each disk in said each flash memory media group, the configuration of said each flash memory media group, and the ratio of sequential to random write I/O types for said each flash memory media group.

These and other features and advantages of the present invention will become apparent to those of ordinary skill in the art in view of the following detailed description of the specific embodiments.

BRIEF DESCRIPTION OF THE DRAWINGS

FIG. 3 shows an example of a RAID Group Management Table according to the first embodiment.
FIG. 4 shows an example of a Virtual Volume Management Table according to the first embodiment.
FIG. 5 shows an example of a Disk Management Table according to the first embodiment.
FIG. 6 shows an example of a Cache Management Table.
FIG. 20 shows an example of an expression to calculate the reliability at step 112-29-1-2 of FIG. 15 according to the first embodiment.

FIG. 23 shows an example of a Disk Management Table according to a second embodiment of the invention.

FIG. 25 shows an example of an expression to calculate the reliability at step 112-29-1-2 of FIG. 15 according to the second embodiment.

FIG. 28 shows an example of a RAID Group Management Table according to the third embodiment.

FIG. 29 shows an example of a Virtual Volume Management Table according to the third embodiment.

FIG. 30 shows an example of a Virtual Volume Page Management Table.

FIG. 31 shows an example of a Capacity Pool Chunk Management Table.

FIG. 32 shows an example of a Capacity Pool Page Management Table.

FIG. 40 shows an example of a Disk Management Table according to the fourth embodiment.

FIG. 41 shows an example of a Virtual Volume Management Table according to the fourth embodiment.

FIG. 42 shows an example of a Virtual Volume Page Management Table according to the fourth embodiment.

FIG. 45 shows an example of an expression to calculate the reliability at step according to the fourth embodiment.

DETAILED DESCRIPTION OF THE INVENTION

Figure 1:
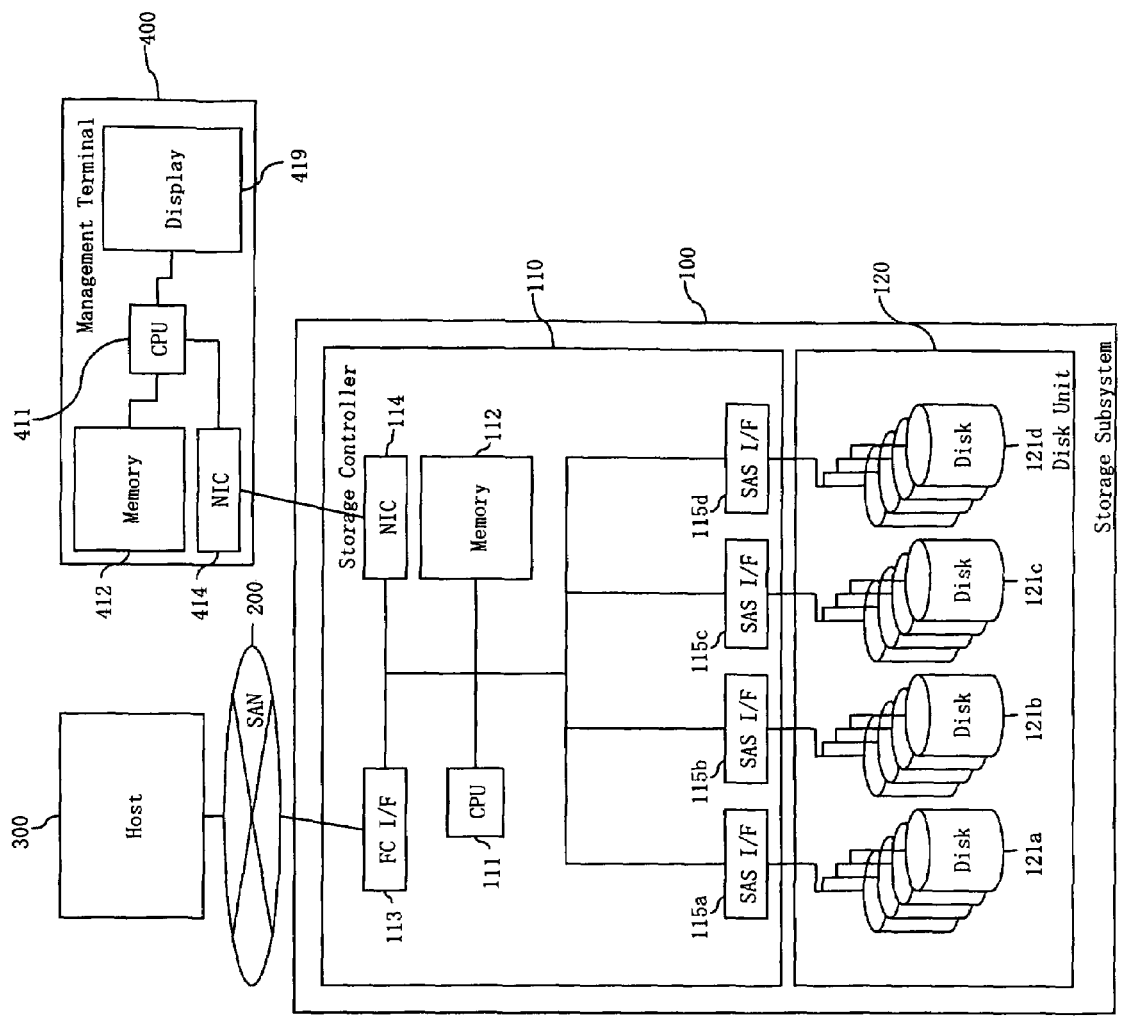
FIG. 1 illustrates an example of a hardware configuration of a computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for predicting flash memory failure caused by the erase operation and protecting against such failure.

First Embodiment

FIG. 1 illustrates an example of a hardware configuration of a computer system in which the method and apparatus of the invention may be applied. A storage subsystem 100 has a storage controller 110 that includes a CPU 111, a memory 112, a storage interface 113, a local network interface 114, and disk interfaces 115a-115d. The CPU 111 controls the storage subsystem 100, and reads programs and tables from the memory 112. The memory 112 stores the programs and tables. The storage interface 113 connects with a host computer 300 via a storage network 200. The local network interface 114 connects with a storage management terminal 400. The disk interfaces 115a-115d connect with a plurality of disks 121a-121d which are stored in a disk unit 120. The disks 121 include flash memory for storing data. The storage network 200 connects the storage subsystem 100 and the host computer 300. The host computer 300 sends I/O requests to the storage subsystem 100 via the storage network 200, and sends data to and receives data from the storage subsystem 100 via the storage network 200. The storage management terminal 400 shows the availability/reliability information of the storage subsystem 100. The terminal 400 includes a CPU 411 which reads programs and tables stored in a memory 412. The local network interface 414 connects with the storage subsystem 100. A display 419 displays the availability/reliability information of the storage subsystem 100.

Hardware

Figure 2:
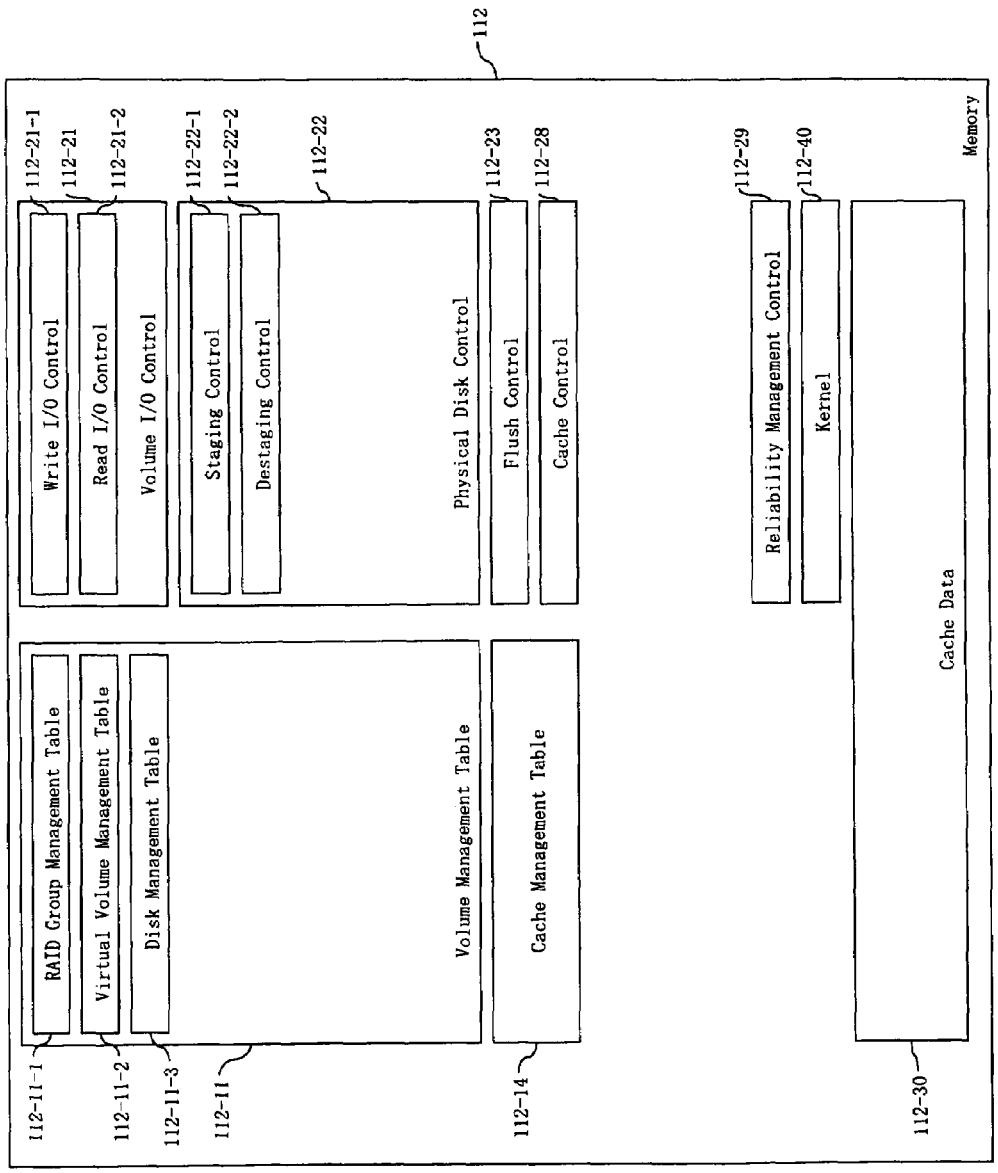
FIG. 2 shows an example of the memory in the storage subsystem according to a first embodiment of the invention.

FIG. 2 shows an example of the memory 112 in the storage subsystem 100 according to a first embodiment of the invention. The memory 112 includes a Volume Management Table 112-11 having a RAID Group Management Table 112-11-1 for the physical structure management of the disks 121 and those groups, a Virtual Volume Management Table 112-11-2 for the volume configuration management, and a Disk Management Table 112-11-3. The memory 112 further includes a Cache Management Table 112-14 for managing a Cache Data Area 112-30 and LRU/MRU (most recently used/least recently used) management. A Volume I/O Control 112-21 includes a Write I/O Control 112-21-1 that runs by a write I/O requirement and receives write data and stores it to the Cache Data Area 112-30 via the channel interface 113, and a Read I/O Control 112-21-2 that runs by a read I/O requirement and sends read data from the Cache Data Area 112-30 via the channel interface 113. A Physical Disk Control 112-22 includes a Staging Control 112-22-1 that transfers data from the disks 121 to the Cache Data Area 112-30, and a Destaging Control 112-22-2 that transfers data from the Cache Data Area 112-30 to the disks 121. A Flush Control 112-23 periodically flushes dirty data in the Cache Data Area 112-30 to the disks 121. A Cache Control 112-24 finds cached data in the Cache Data Area 112-30, and allocates a new cache area in the Cache Data Area 112-30. A Reliability Management Control 112-29 calculates reliabilities about each of the RAID groups or thin provisioning pools by its configuration and disk information, and reports the reliability information to the storage management terminal 400. A Kernel 112-40 controls the schedules of running program. The Cache Data Area 112-30 stores read and write cache data, and are separated into a plurality of cache slots.

FIG. 3 shows an example of the RAID Group Management Table 112-11-1 according to the first embodiment. The table lists the RAID Group Number 112-11-1-1 representing the ID of the RAID group, and the RAID Level 112-11-1-2 representing the structure of RAID group. The "N(=10, 5, 6, etc)" means "RAID Level is N." "N/A" means the RAID Group does not exist. The table further lists the Disk Number 112-11-1-3 representing the ID list of disks 121 belonging to the RAID group, and the RAID Group Capacity 112-11-1-4 representing the total capacity of the RAID group except the redundant area.

FIG. 4 shows an example of the Virtual Volume Management Table 112-11-2 according to the first embodiment. The table lists the Volume Number 112-11-2-1 representing the ID of the volume, and the Volume Capacity 112-11-2-2 representing the capacity of the volume. "N/A" means the volume does not exist. The table further lists the using RAID Group Number 112-11-2-3 representing the RAID Group ID that the volume currently uses, the Top Address Number 112-11-2-4 representing the top address that the volume uses in the RAID group, the Sequential Write Counter 112-11-2-6 representing a counter of the sequential write I/O to the volume, and the Random Write Counter 112-11-2-7 representing a counter of the random write I/O to the volume.

FIG. 5 shows an example of the Disk Management Table 112-11-3 according to the first embodiment. The table lists the Disk Number 112-11-3-1 representing the ID of the disk, and the Disk Capacity 112-11-3-2 representing the capacity of the disk.

FIG. 6 shows an example of the Cache Management Table 112-14. The table lists the Cache Slot Number (Index) 112-14-1 representing the ID of the cache slot in the Cache Data Area 112-30, the Volume Number 112-14-2 representing the ID of the virtual volume 141 to which the cache slot belongs, the Virtual Volume Address (Logical Block Address or LBA) 112-14-3 relating to the cache slot, and the Next Slot Pointer 112-14-4 representing the next cache slot number for queue management. "NULL" means a terminal of the queue. The table further lists the Kind of Queue Information 112-14-5 representing the kind of cache slot queue. "Free" means a queue that has the unused cache slots. "Clean" means a queue that has cache slots that store the same data as the disk slots. "Dirty" means a queue that has cache slots that store different data from the disk slots, so that the storage controller 110 needs to flush the cache slot data to the disk slot in the future. The Queue Index Pointer 112-14-6 in the table represents the index of the cache slot queue.

Logical Structure

Figure 7:
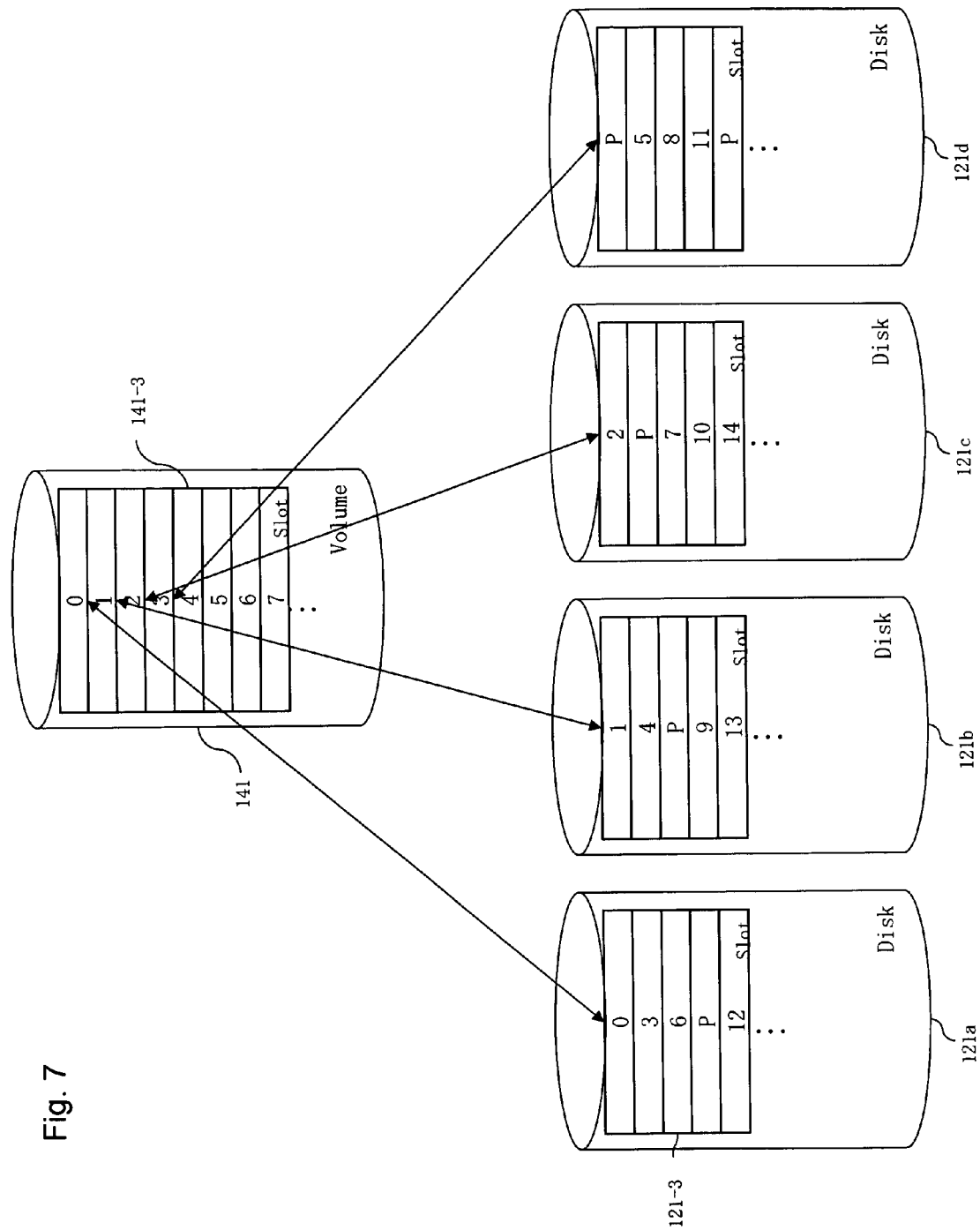
FIG. 7 shows an exemplary logical structure illustrating a relation between the virtual volume and the disk.

FIG. 7 shows an exemplary logical structure illustrating a relation between the virtual volume 141 and the disks 121. The solid arrowed lines each refer to an object by calculation. For the virtual volume slots 141-3, the virtual volume 141 is divided into a plurality of virtual volume slots 141-3, and each virtual volume slot 141-3 relates to a disk slot 121-3. For the disk slots 121-3, each disk 121 is divided into a plurality of disk slots 121-3, and each disk slot 121-3 relates to a virtual volume slot 141-3 except the parity data area.

Figure 8:
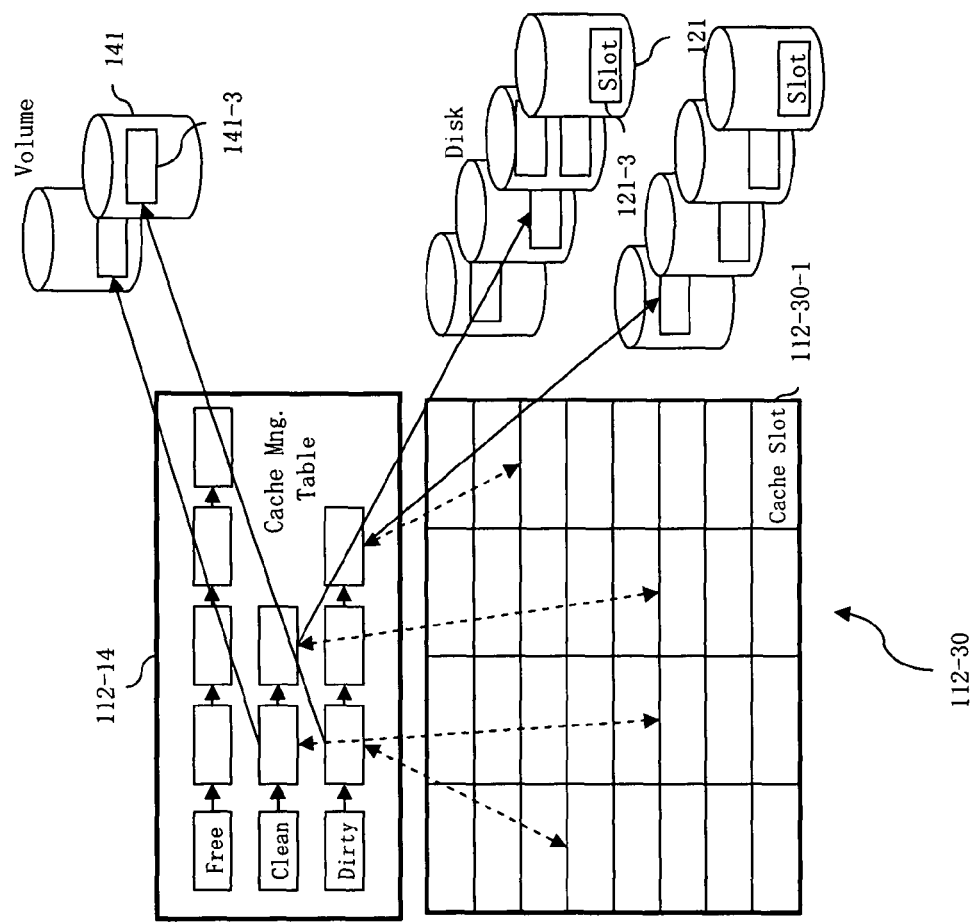
FIG. 8 shows an example of a table reference structure for the Cache Management Table.

FIG. 8 shows an example of a table reference structure for the Cache Management Table 112-14. The arrowed lines include dashed lines and solid lines. A dashed line refers to an object by pointer. A solid line refers to an object by calculation. The Cache Data Area 112-30 is divided into a plurality of cache slots 112-30-1. The size of a cache slot 112-30-1 equals to the size of a capacity pool stripe 121-3 and to the size of a virtual volume slot 141-3. The Cache Management Table 112-18 and the cache slot 112-30-1 are on a one-to-one relation. When the Cache Management Table 112-18 refers to a virtual volume slot 141-3, it can resolve the capacity pool stripe 121-3 by referring to the RAID Group Management Table 112-11-1.

Program Flow

Figure 9:
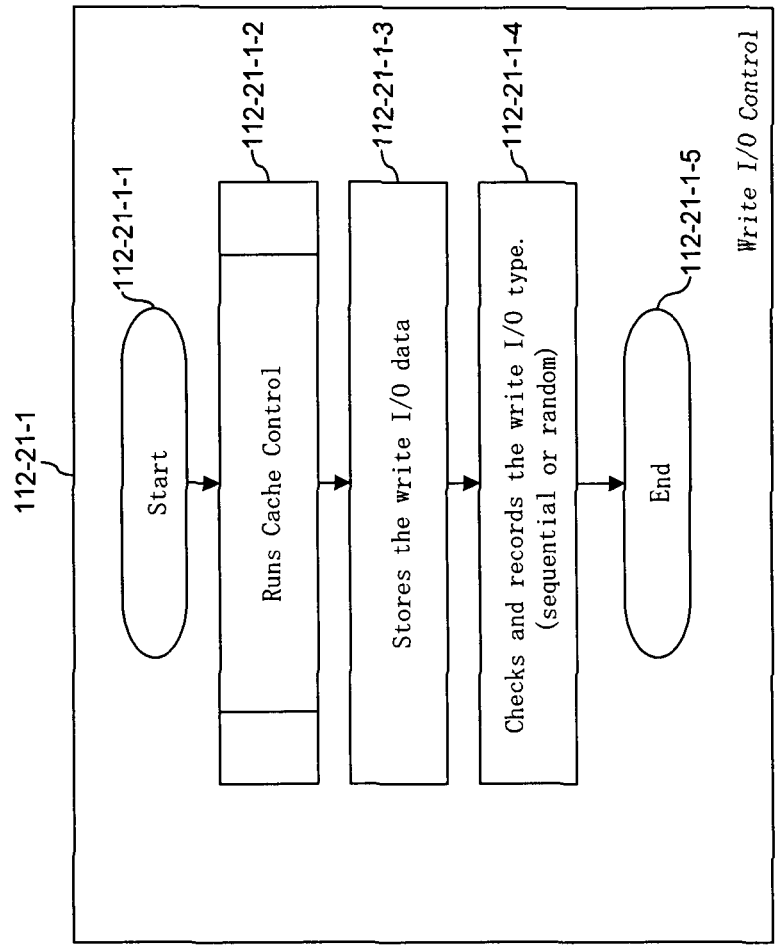
FIG. 9 shows an example of a process flow diagram of the Write I/O Control.

FIG. 9 shows an example of a process flow diagram of the Write I/O Control 112-21-1, starting at step 112-21-1-1. In step 112-21-1-2, the program calls the Cache Control 112-24 to search for a cache slot 112-30-1. In step 112-21-1-3, the program receives the write I/O data from the host computer 300 and stores the data to the aforesaid cache slot 112-30-1. In step 112-21-1-4, the program checks the write I/O type (sequential or random) by the previous write I/O address. If the write I/O is sequential, the program counts up the Sequential Write Counter 112-11-2-6. If the write I/O is random, the program counts up the Random Write Counter 112-11-2-7. The process ends at step 112-21-1-5.

Figure 10:
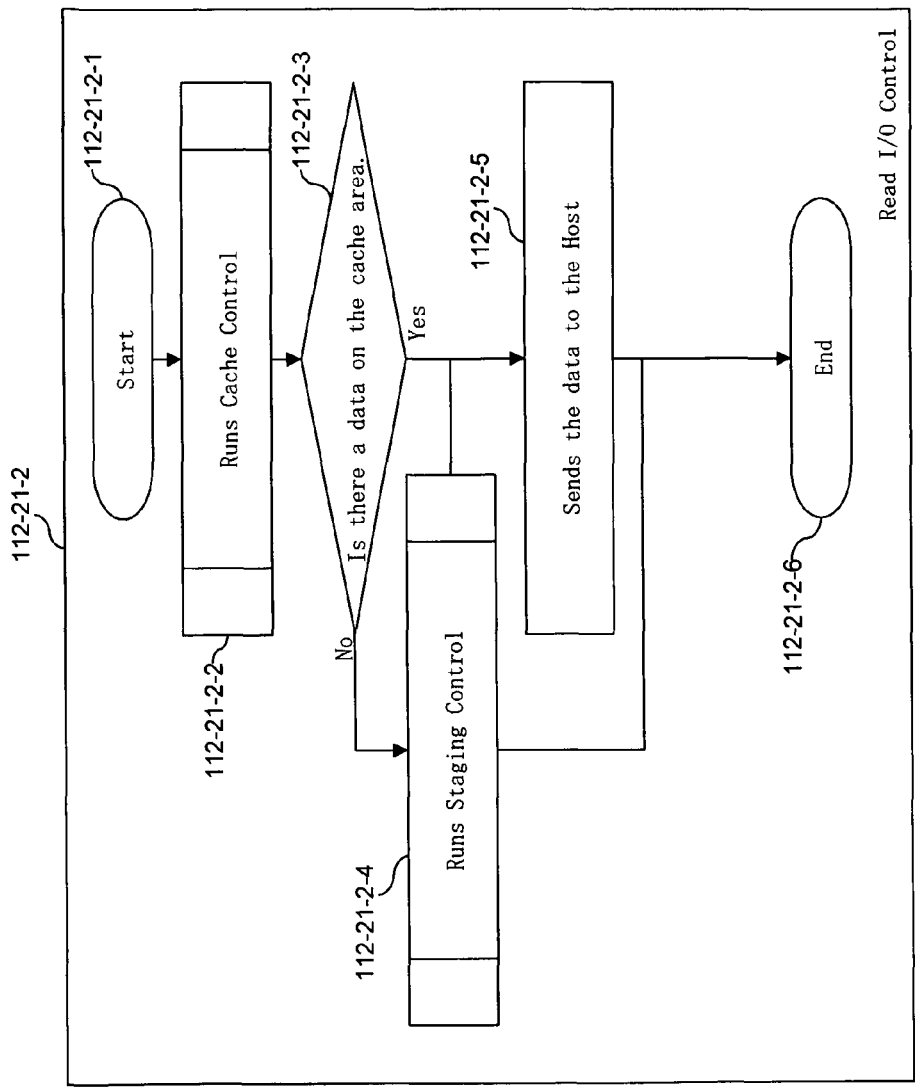
FIG. 10 shows an example of a process flow diagram for the Read I/O Control.

FIG. 10 shows an example of a process flow diagram for the Read I/O Control 112-21-2, starting at step 112-21-2-1. In step 112-21-2-2, the program calls the Cache Control 112-24 to search for a cache slot 112-30-1. In step 112-21-2-3, the program checks the status of the aforesaid cache slot 112-30-1 as to whether the data has already been stored there or not. If no, in step 112-21-2-4, the program calls the Staging Control 112-22-1. If yes, in 112-21-2-5, the program transfers the data of the cache slot 112-30-1 to the host computer 300. The process ends at step 112-21-2-6.

Figure 11:
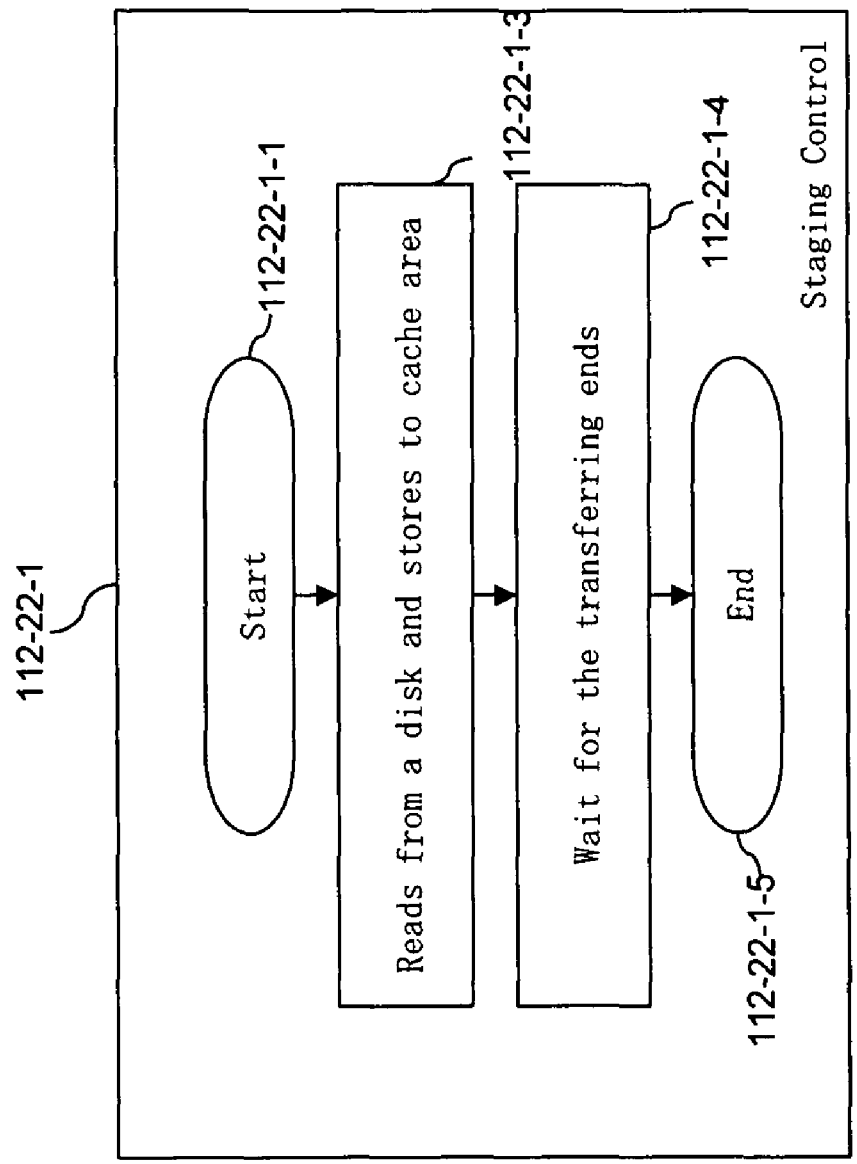
FIG. 11 is an example of a process flow diagram for the Staging Control.

FIG. 11 is an example of a process flow diagram for the Staging Control 112-22-1 starting at step 112-22-1-1. In step 112-22-1-3, the program reads data from a slot in the disk 121 and stores the data to the Cache Data Area 112-30. In step 112-22-1-4, the program waits for the data transfer to end. The process ends at step 112-22-1-5.

Figure 12:
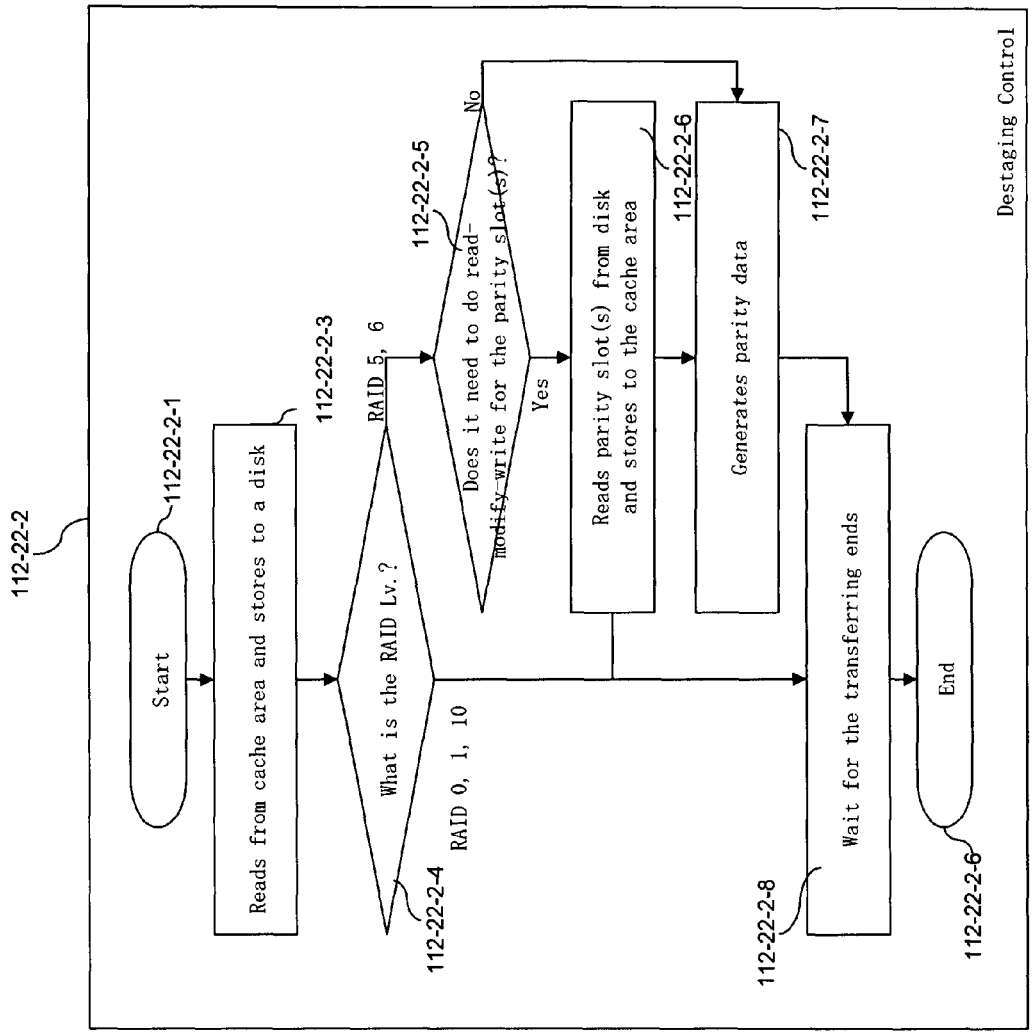
FIG. 12 is an example of a process flow diagram for the Destaging Control according to the first embodiment.

FIG. 12 is an example of a process flow diagram for the Destaging Control 112-22-2 according to the first embodiment, starting at step 112-22-2-1. In step 112-22-2-3, the program reads data from the Cache Data Area 112-30 and stores the data to a slot in a disk 121. In step 112-22-2-4, the program checks the RAID level to which the slot belongs. If the RAID level is RAID 0, 1, or 10, the program skips to step 112-22-2-8. If the RAID level is RAID 5 or 6, in step 112-22-2-5, the program checks whether there are data of the other slots belonging to the same parity row in the Cache Data Area 112-30, and determines whether it needs to perform a read-modify-write for the parity slot(s). If yes, in step 112-22-2-6 (case involving cache miss), the program stages the parity slot data from the disk 121. If no, the program skips step 112-22-2-6. In step 112-22-2-7, the program generates new parity data. If there is no need to do read-modify-write (no in step 112-22-2-5), the program calculates the new parity data based on the written data stored in the cache data area 112-30. If there is a need to do read-modify-write (yes in step 112-22-2-5), the program calculates the new parity data based on the written data stored in the cache data area 112-30 and the current parity data stored at step 112-22-2-6. In step 112-22-2-8, the program waits for the data transfer to end.

Figure 13:
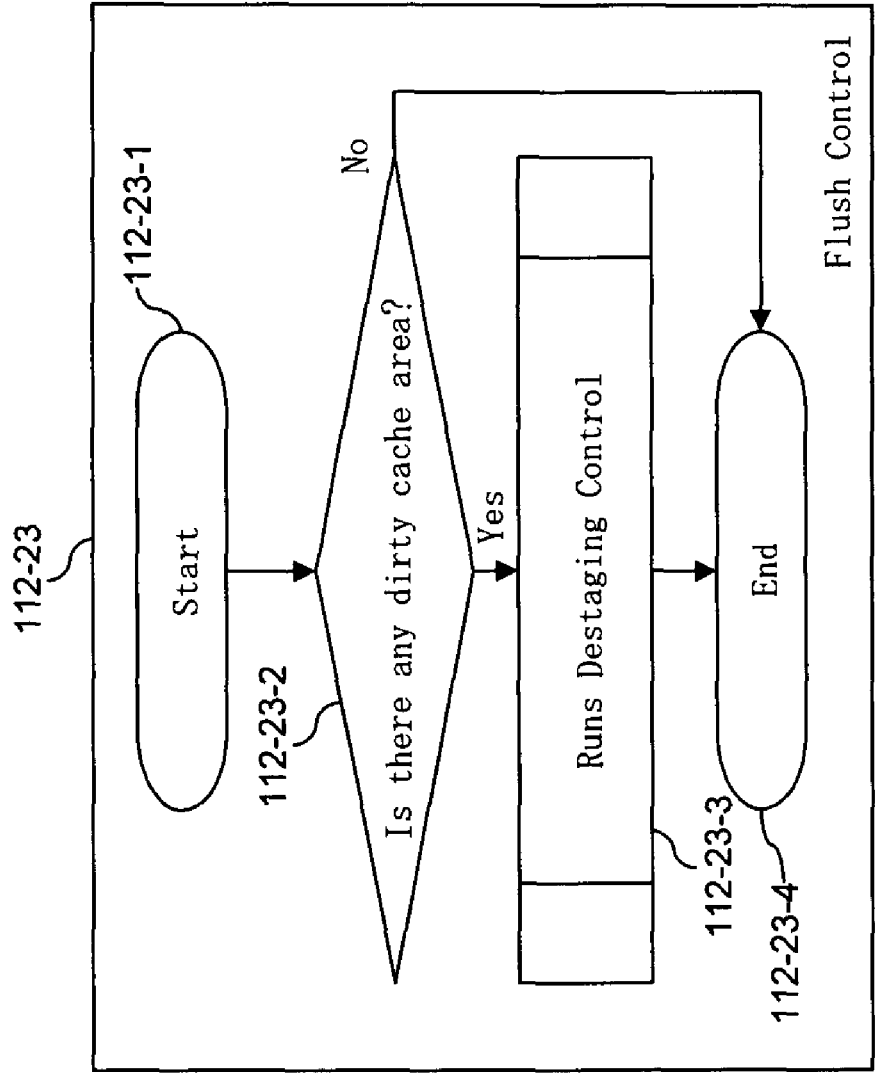
FIG. 13 is an example of a process flow diagram for the Flush Control.

FIG. 13 is an example of a process flow diagram for the Flush Control 112-23, starting at step 112-23-1. In step 112-23-2, the program reads "Dirty Queue" of the Cache Management Table 112-14. If there is a dirty cache area, in step 112-23-3, the program calls the Destaging Control 112-22-2 for the found dirty cache slot 112-30-1. If no, the program ends at step 112-23-4.

Figure 14:
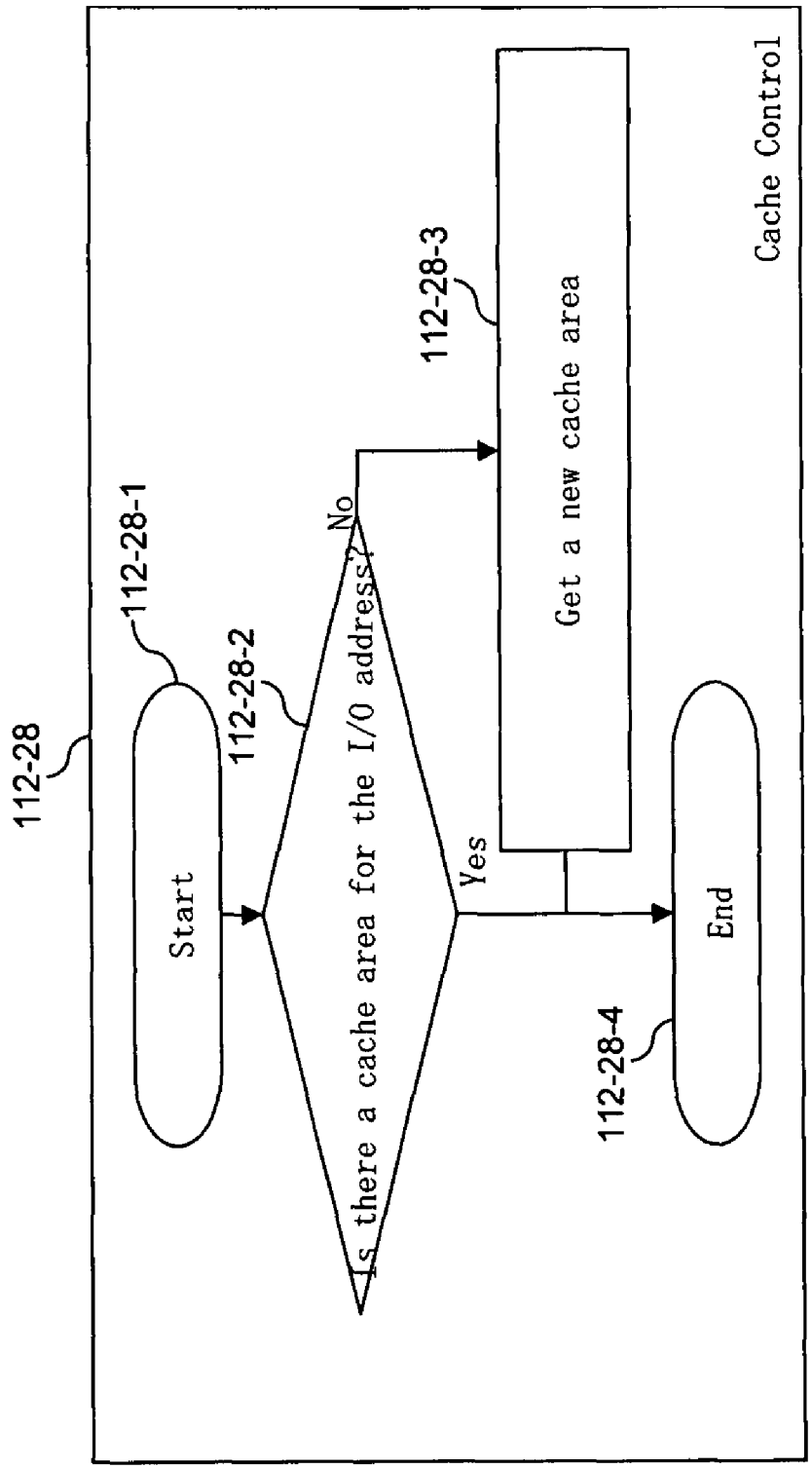
FIG. 14 is an example of a process flow diagram for the Cache Control.

FIG. 14 is an example of a process flow diagram for the Cache Control 112-28, starting at step 112-28-1. In step 112-28-2, the program reads the Cache Management Table 112-14 and searches for the designated address of the virtual volume slot 141-1 or capacity pool stripe 121-1. If there is no cache area for the I/O address, in step 112-28-3, the program gets a new cache slot 112-30-1 for the designated address from the "Free" or "Clean" queue. If there is a cache area for the I/O address, the program ends at step 112-28-4.

Figure 15:
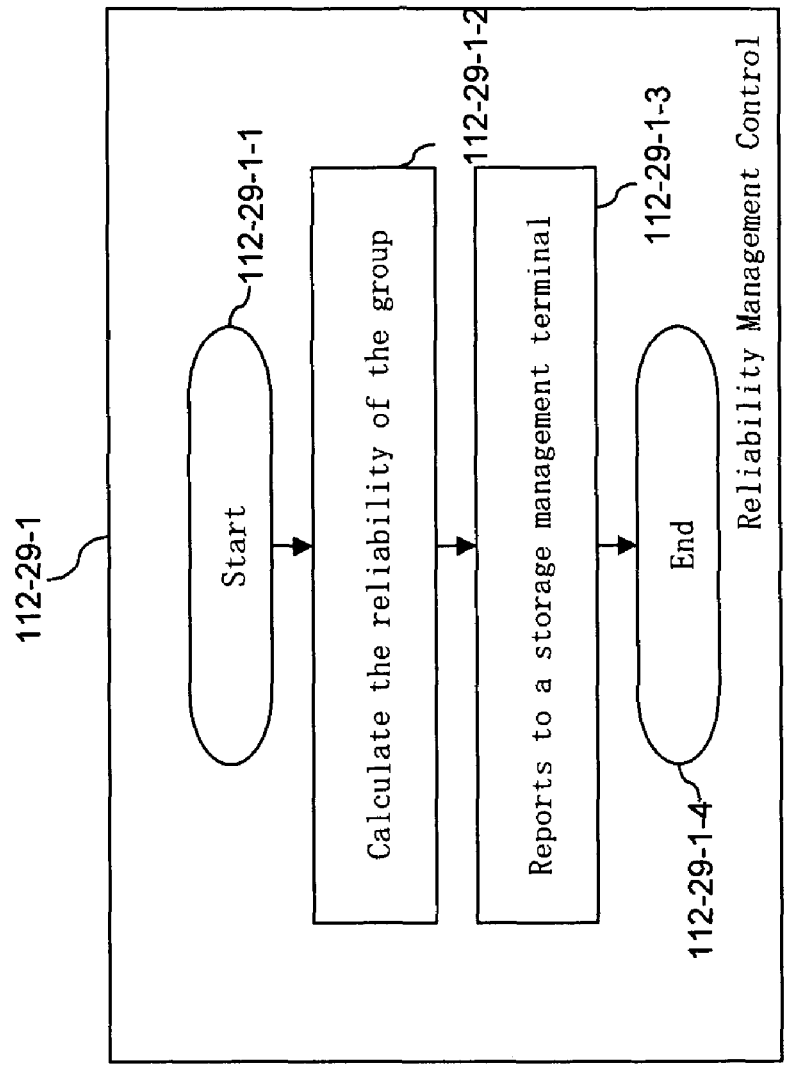
FIG. 15 is an example of a process flow diagram for the Reliability Management Control.

FIG. 15 is an example of a process flow diagram for the Reliability Management Control 112-29-1, starting at step 112-29-1-1. In step 112-29-1-2, the process calculates the remaining life of groups (RAID group, thin provisioning group) from the I/O type ratio (by using Sequential Write Counter 112-11-2-6 and Random Write Counter 112-11-2-7), the remaining life information of each disk 121, and the structure of the group (by using the RAID Group Management Table 112-11-1). In step 112-29-1-3, the program sends the calculation result to the storage management terminal 400. The program ends at step 112-29-1-4

Sequence of Data Flow

Figure 16:
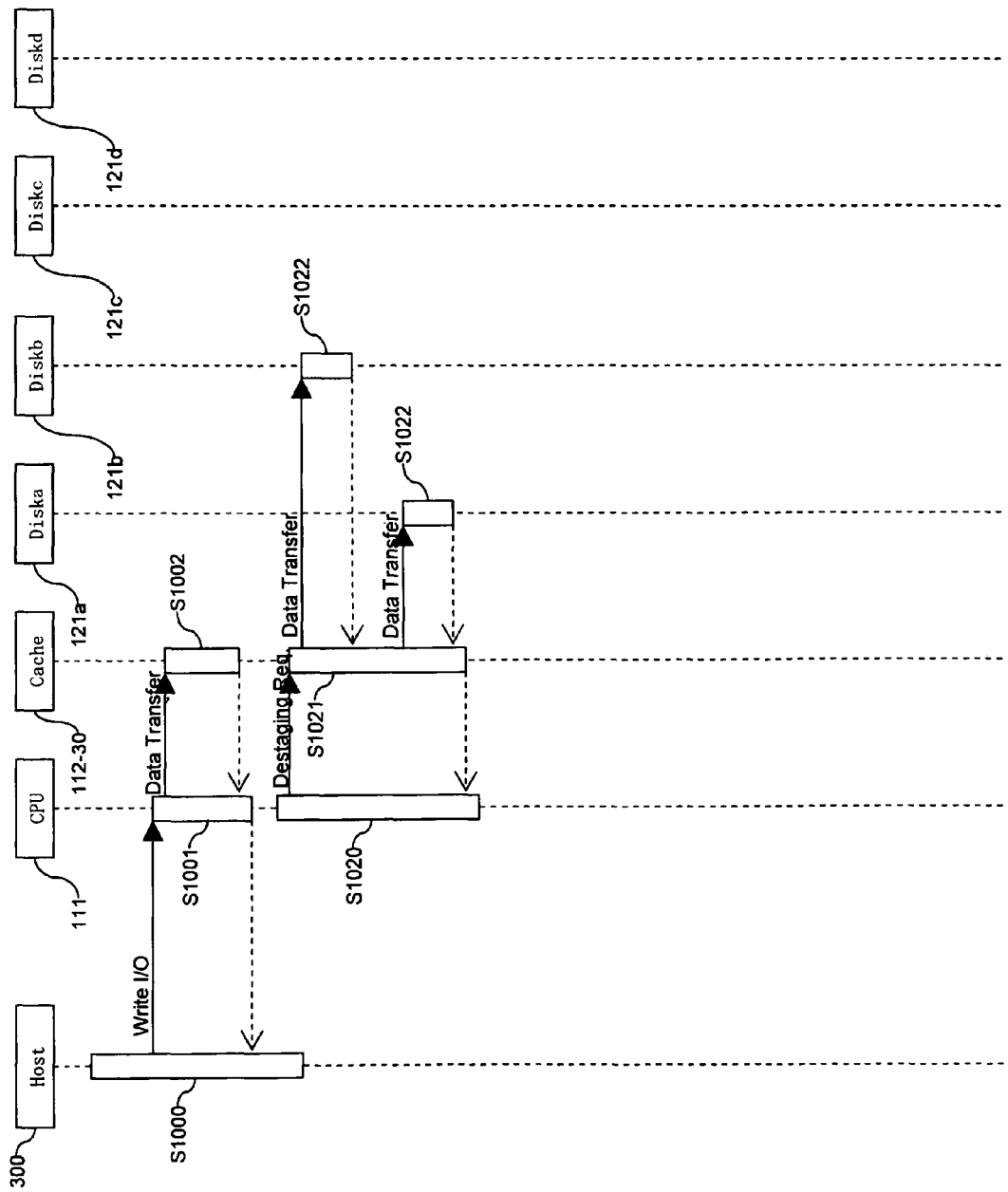
FIG. 16 shows an example of a sequence chart of the sequential or random write I/O to RAID 1 or 10 volume.

FIG. 16 shows an example of a sequence chart of the sequential or random write I/O to RAID 1 or 10 volume. At S1000, the host computer 300 requests write I/O and sends data to the storage subsystem 100. At S1001, the storage subsystem 100 receives data from the host computer 300. The CPU 111 runs the Write I/O Control 112-21-1 and stores the data to the Cache Data Area 112-30. At S1002, the Cache Data Area 112-30 stores data. At S1020, the CPU 111 runs the Flush Control 112-23, finds the write I/O data, and orders to transfer data from the Cache Data Area 112-30 to the disks 121 (disk a and disk b). At S1021, the Cache Data Area 112-30 doubly transfers data to the disks 121 (disk a and disk b). At S1022, the disks 121 receive and store data.

Figure 17:
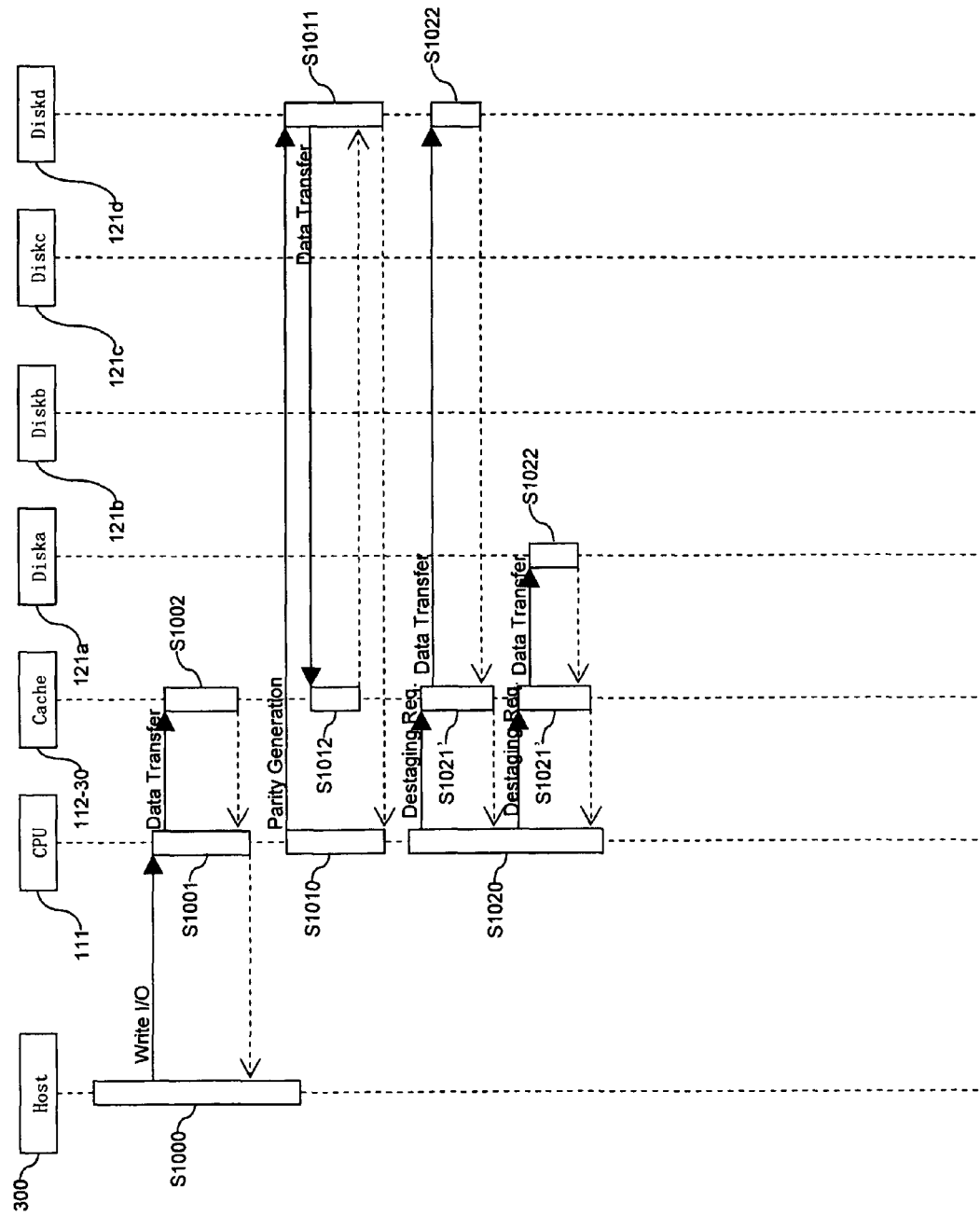
FIG. 17 shows an example of a sequence chart of random write I/O to RAID 5 volume.

FIG. 17 shows an example of a sequence chart of random write I/O to RAID 5 volume. Only the differences as compared to FIG. 16 are described. At S1010, the CPU 111 orders to transfer the parity data from the disk 121 (disk d) to the Cache Data Area 112-30 and generates new parity data from the written data and the staged parity data on the Cache Data Area 112-30. At S1011, the disk 121 (disk d) transfers data to the Cache Data Area 112-30. At S1012, the Cache Data Area 112-30 receives data from the disk 121. At S021', the Cache Data Area 112-30 transfers data to the disks 121 (disk a and disk d).

Figure 18:
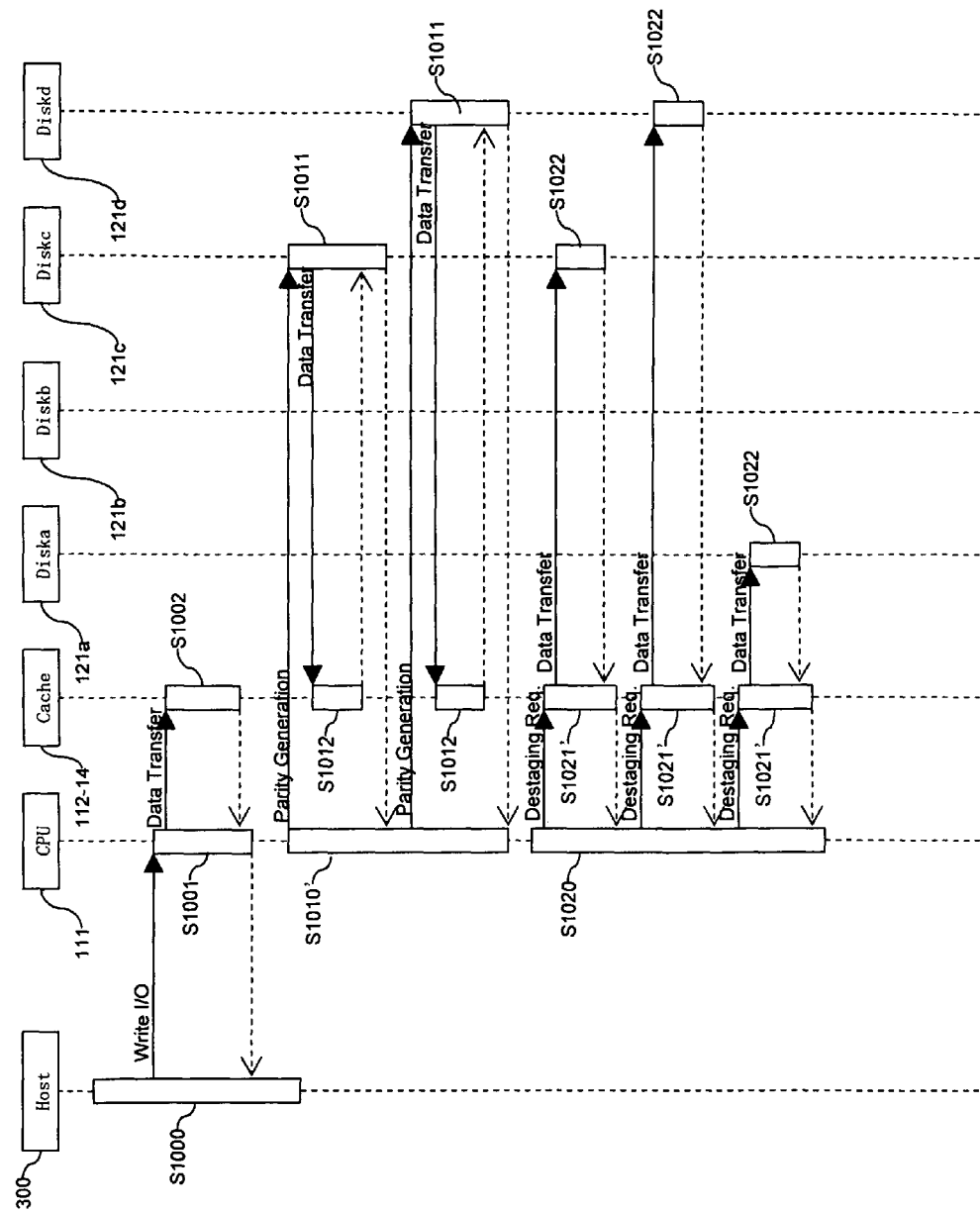
FIG. 18 shows an example of a sequence chart of random write I/O to RAID 6 volume.

FIG. 18 shows an example of a sequence chart of random write I/O to RAID 6 volume. Only the differences as compared to FIG. 17 are described. At S1010', the CPU 111 orders to transfer the parity data from the disks 121 (disk c and disk d) to the Cache Data Area 112-30 and generates new parity data from the written data and the staged parity data on the Cache Data Area 112-30.

Figure 19:
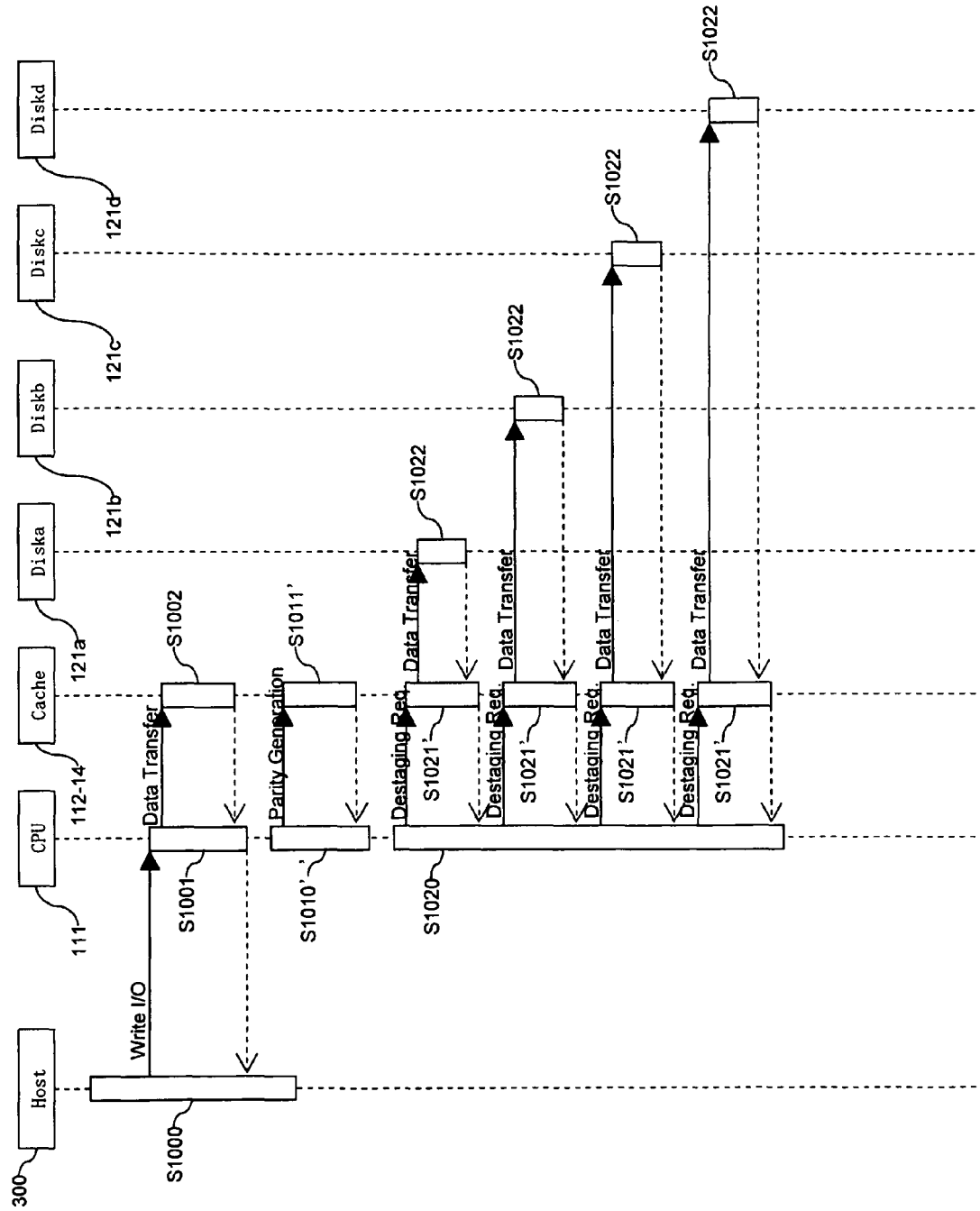
FIG. 19 shows an example of a sequence chart of random write I/O to RAID 6 volume.

FIG. 19 shows an example of a sequence chart of random write I/O to RAID 6 volume. Only the differences as compared to FIG. 17 are described. At S1010", the CPU 111 generates new parity data from the written data on the Cache Data Area 112-30 and stores the data to the Cache Data Area 112-30. At S1011 ',the Cache Data Area 112-30 stores the generated parity data.

Expression

FIG. 20 shows an example of an expression to calculate the reliability at step 112-29-1-2 of FIG. 15 according to the first embodiment. The expression includes a number of variables and suffices. The variable V100 expresses the remaining life of the group. The suffix V101 expresses the RAID Level of the calculation target RAID group. The suffix V102 expresses the Write I/O type information (sequential or random). The variable V103 expresses the remaining life of the group in the condition under suffices V101 and V102. The variable V104 expresses the ID of a disk. The variable V105 expresses the number of disks in the group. The variable V106 expresses the remaining life of a disk. The variable V107 expresses a ratio of the write I/O to the group.

The expression E100 calculates the life of the group in the sequential and random write I/O mixed environment. The expression El01 calculates the life of the group in RAID 10 and the sequential or random write I/O environment. Because RAID 10 writes data doubly, this expression includes "divides by 2." The expression E102 calculates the life of the group in RAID 5 and the sequential write I/O environment. Because RAID 5 writes (N−1) data and 1 parity data in the sequential write environment, this expression includes "subtracts by 1." The expression E103 calculates the life of the group in RAID 5 and the random write I/O environment. Because RAID 5 writes 1 data and 1 parity data in the random write environment, this expression includes "divides by 2." The expression E104 calculates the life of the group in RAID 6 and the sequential write I/O environment. Because RAID 6 writes 1 data and 2 parity data in the sequential write environment, this expression includes "subtracts by 2." The expression E105 calculates the life of the group in RAID 6 and the random write I/O environment. Because RAID 6 writes data and 2 parity data in the random write environment, this expression includes "divides by 3."

Output Display

Figure 21:
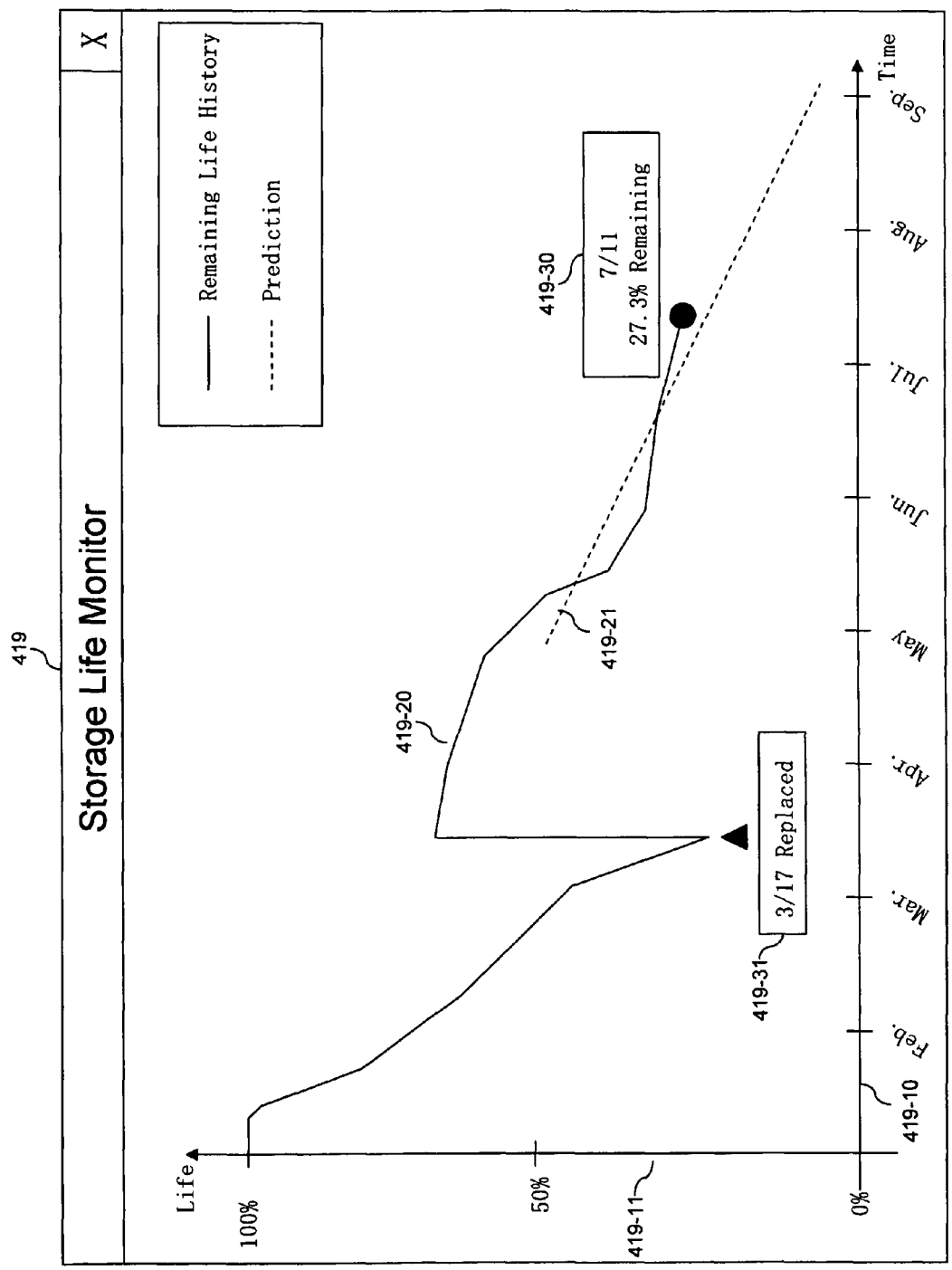
FIG. 21 shows an example of the output image on the display.
Figure 22:
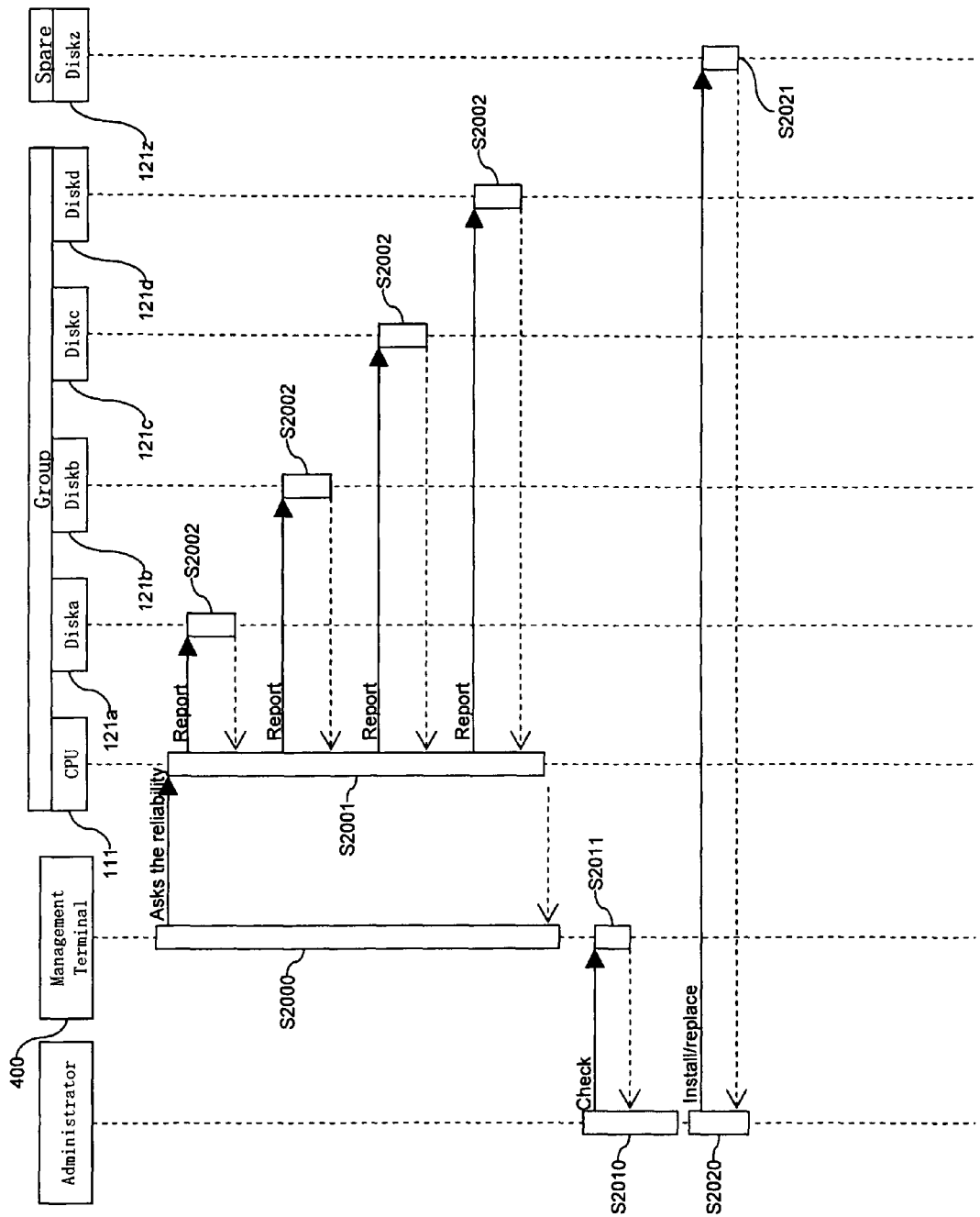
FIG. 22 shows an example of a sequence chart to check the reliability and replace a disk according to the first embodiment.

FIG. 21 shows an example of the output image on the display 419. An administrator monitors the reliability of the storage subsystem 100. The axis 419-10 (x axis) represents time alternation. The axis 419-11 (y axis) represents the remaining life percentage. The line 419-20 represents the remaining life history of the group. The dashed line 419-21 represents the remaining life prediction of the group. This line is calculated by the remaining life history. The event 419-30 points to and shows the current date and remaining life. The event 419-31 points to and shows the past disk replacing event Sequence of System Management FIG. 22 shows an example of a sequence chart to check the reliability and replace a disk according to the first embodiment. At S2000, the storage management terminal 400 requests to send the group life information to the storage subsystem 100. At S2001, the CPU 111 asks for the remaining life from each disk in a certain group and calculates its remaining life and reports to the storage management terminal 400. At S2002, the disk 121 sends its own remaining life information to the CPU 111. At S2010, the administrator checks the display 419. At S2011, the storage management terminal shows the remaining life information to the display 419. At S2020, the administrator installs or replaces a new disk 121z to the storage subsystem 100. At S2021, the storage subsystem 100 stores the new disk 121z.

Second Embodiment

Only differences between the second embodiment and the first embodiment are described.

Hardware

FIG. 23 shows an example of a Disk Management Table 112-11-3' according to a second embodiment of the invention. Two values are added to the table as compared to FIG. 5. The first is the Life Limit Information 112-11-3'-3 representing the limit number of write times or operations to the disk. This value depends on the flash memory chip type (SLC/MLC), vendor, disk model, capacity (reserved capacity), and wear leveling algorithm. The second is the Life Counter 112-11-3'-4 representing the number of write times to the disk.

Figure 24:
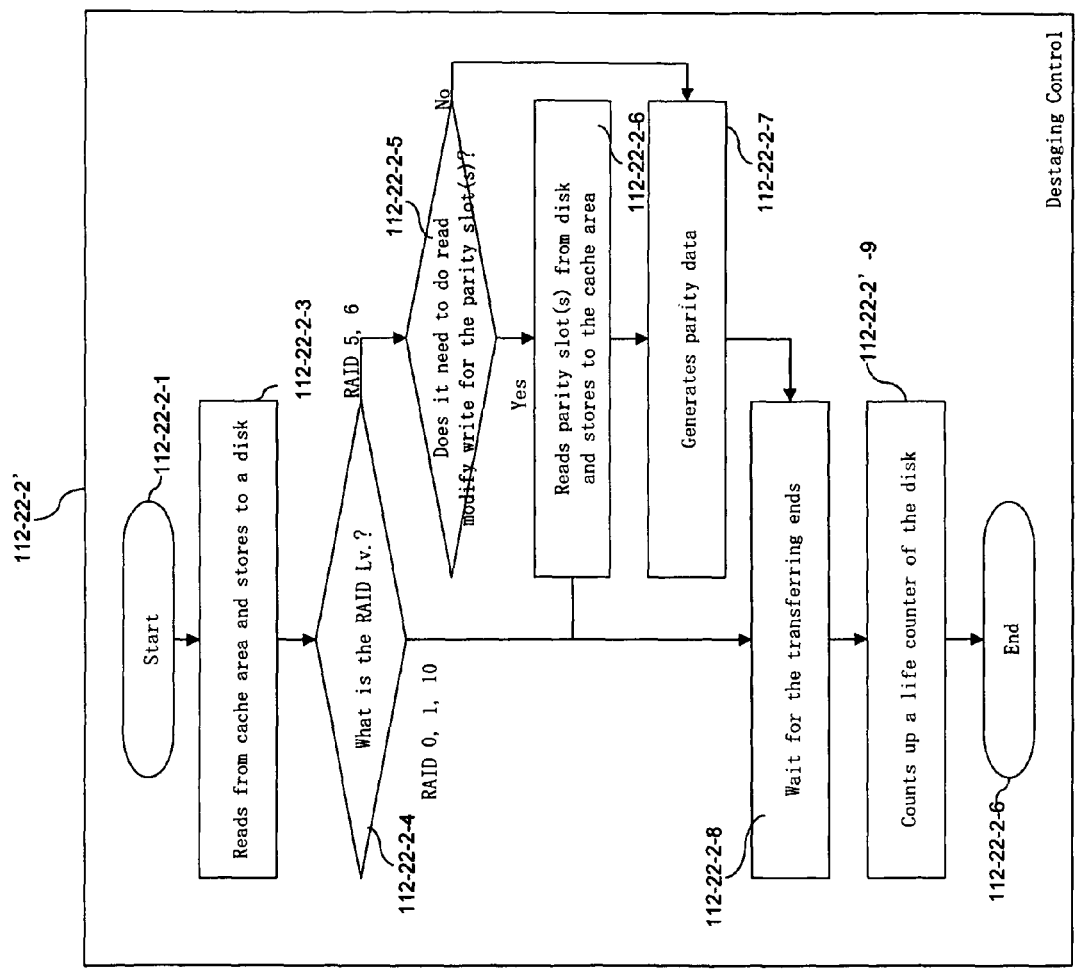
FIG. 24 shows an example of a process flow diagram for the Destaging Control according to the second embodiment.

FIG. 24 shows an example of a process flow diagram for the Destaging Control 112-22-2' according to the second embodiment. One step is added to the table as compared to FIG. 12. In step 112-22-2'-9, the process counts up the Life Counter 112-11-3'-4.

Expression

FIG. 25 shows an example of an expression to calculate the reliability at step 112-29-1-2 of FIG. 15 according to the second embodiment. Two variables are added and one variable is replaced. The two added variables are variable V108' representing the limit of write number of times to the disk and variable V109' representing the current write number of times to the disk. The variable V107 is replaced by the variable V107', which defines the parameter with the variable V108' and variable V109'.

Sequence of System Management

Figure 26:
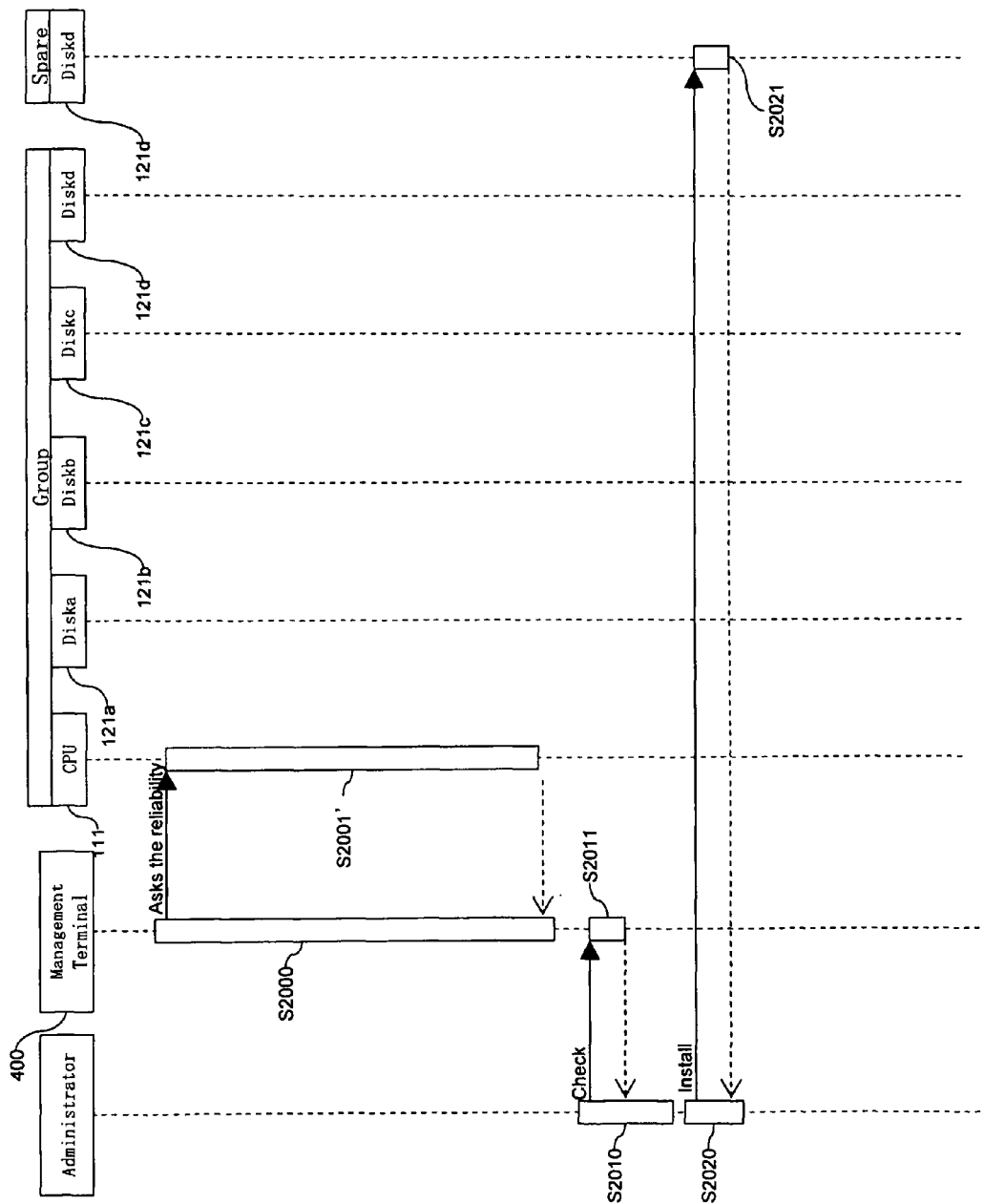
FIG. 26 shows an example of a sequence chart to check the reliability and replace a disk according to the second embodiment.

FIG. 26 shows an example of a sequence chart to check the reliability and replace a disk according to the second embodiment. One step is replaced as compared to FIG. 22. At S2001' (replacing S2001), the CPU 111 calculates the remaining life of RAID groups from the Life Limit Information 112-11-3'-3 and Life Counter 112-11-3'-4, and reports to the storage management terminal 400.

Third Embodiment

Only differences between the third embodiment and the first embodiment are described.

Hardware

Figure 27:
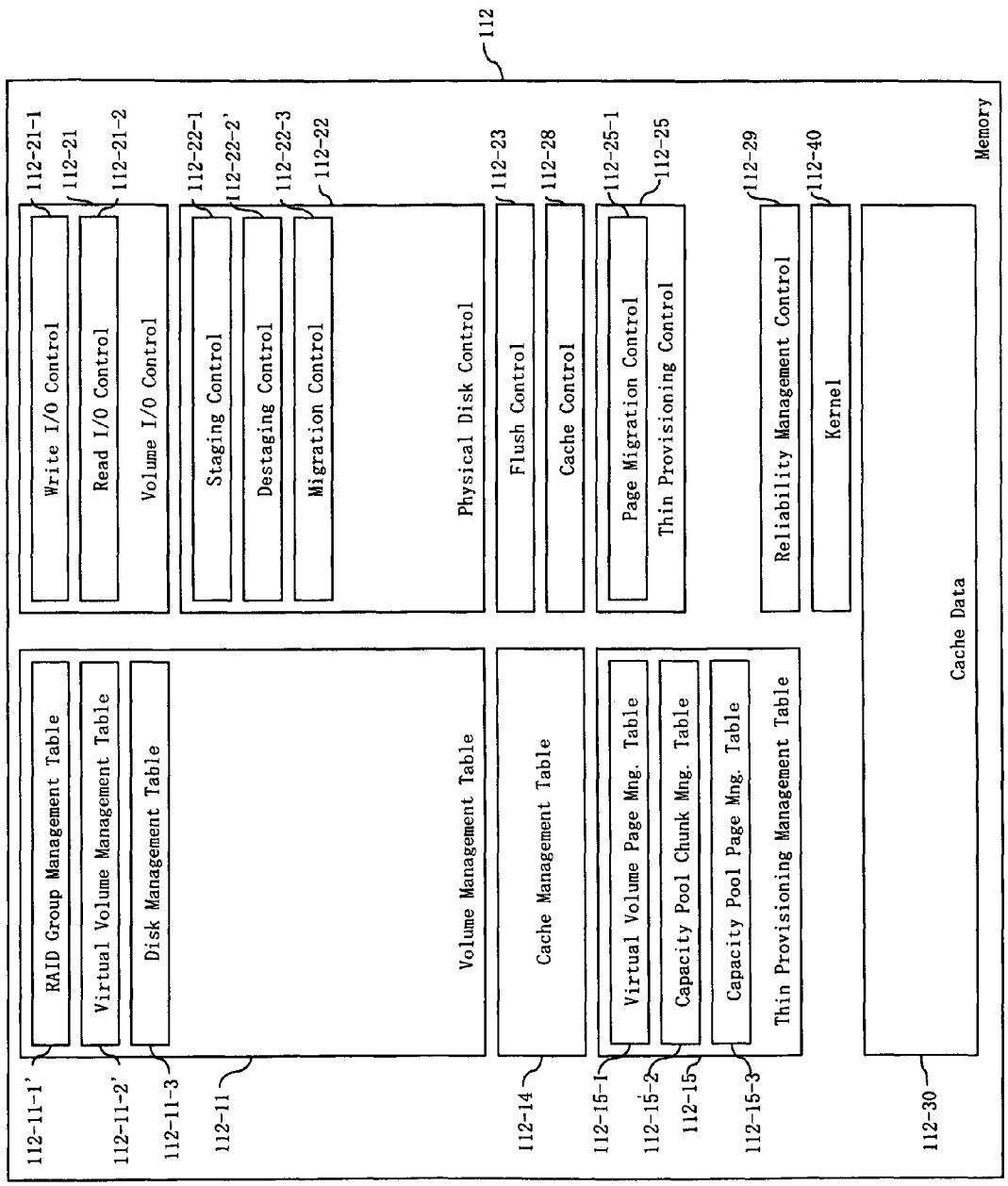
FIG. 27 shows an example of the memory in the storage subsystem according to a third embodiment of the invention.

FIG. 27 shows an example of the memory 112 in the storage subsystem according to a third embodiment of the invention. Four elements are replaced and five elements are added as compared to FIG. 2. The replacing elements are the RAID Group Management Table 112-11-1', Virtual Volume Management Table 112-11-2', and Destaging Control 112-22-2'. The added elements are Virtual Volume Page Management Table 112-15-1, Capacity Pool Chunk Management Table 112-15-2, Capacity Pool Page Management Table 112-15-3, Page Migration Control 112-25-1, and the migration control 112-22-3. In the Volume Management Table 112-11, the RAID Group Management Table 112-11-1' provides physical structure management for the disks 121 and those groups. The Virtual Volume Management Table 112-11-2' provides volume configuration management. In the added Thin Provisioning Management Table 112-15, the Virtual Volume Page Management Table 112-15-1 provides reference management from a partition of a virtual volume to a partition of a capacity pool, the Capacity Pool Chunk Management Table 112-15-2 provides resource management of a capacity pool and reference management from a capacity pool page to a virtual volume page, and the Capacity Pool Page Management Table 112-15-3 provides resource management of a capacity pool chunk. In the Physical Disk Control 112-22, the Destaging Control 112-22-2' transfers data from the Cache Data Area 112-30 to the disks 121 and allocates new pages, and the migration control 112-22-3. In the added Thin Provisioning Control 112-25, the Page Migration Control 112-25-1 migrates one capacity pool page to another capacity pool page.

FIG. 28 shows an example of a RAID Group Management Table 112-11-1' according to the third embodiment. Two values are added to the table as compared to FIG. 3. The Free Chunk Queue Index 112-11-1-5' manages unused thin provisioning chunks. The Used Chunk Queue Index 112-11-1-6' manages used thin provisioning chunks.

FIG. 29 shows an example of a Virtual Volume Management Table 112-11-2 according to the third embodiment. One value is deleted (Top Address in FIG. 4) and one value is added to the table as compared to FIG. 4. The added Using Chunk Number 112-11-2-5' lists the Chunk ID that the virtual volume currently uses. The Using RAID Group Number 112-11-2-3' (112-11-2-3 in FIG. 4) lists the RAID Group ID of a chunk that the virtual volume currently uses.

FIG. 30 shows an example of a Virtual Volume Page Management Table 112-15-1. The Virtual Volume Page Index 112-15-1-1 lists the top address of the virtual volume page. The RAID Group Number 112-15-1-2 lists the RAID Group ID to which the virtual volume page belongs. "N/A" means no capacity pool page is allocated to the virtual volume page. The Capacity Pool Page Index 112-15-1-3 lists the top address of a capacity pool page to which the virtual volume page refers.

FIG. 31 shows an example of a Capacity Pool Chunk Management Table 112-15-2. The Capacity Pool Chunk Number 112-15-2-1 lists the ID of the capacity pool chunk. The Virtual Volume Number 112-15-2-2 lists the ID of a virtual volume by which the capacity pool chunk is referred. The Used Capacity 112-15-2-3 lists the used capacity of the capacity pool chunk. The Deleted Capacity 112-15-2-4 lists the removed capacity of the capacity pool chunk once the area has used. The Previous Chunk Number 112-15-2-5 lists the previous chunk pointer for queue management. The Next Chunk Number 112-15-2-6 lists the next chunk pointer for queue management. "NULL" means a terminal of the queue.

FIG. 32 shows an example of a Capacity Pool Page Management Table 112-15-3. The Capacity Pool Page Index 112-15-1 lists the ID of the capacity pool page. "N/A" means the capacity pool page is unused. The Virtual Volume Page Number 112-15-2 lists the ID of a virtual volume page by which the capacity pool page is referred.

Figure 33:
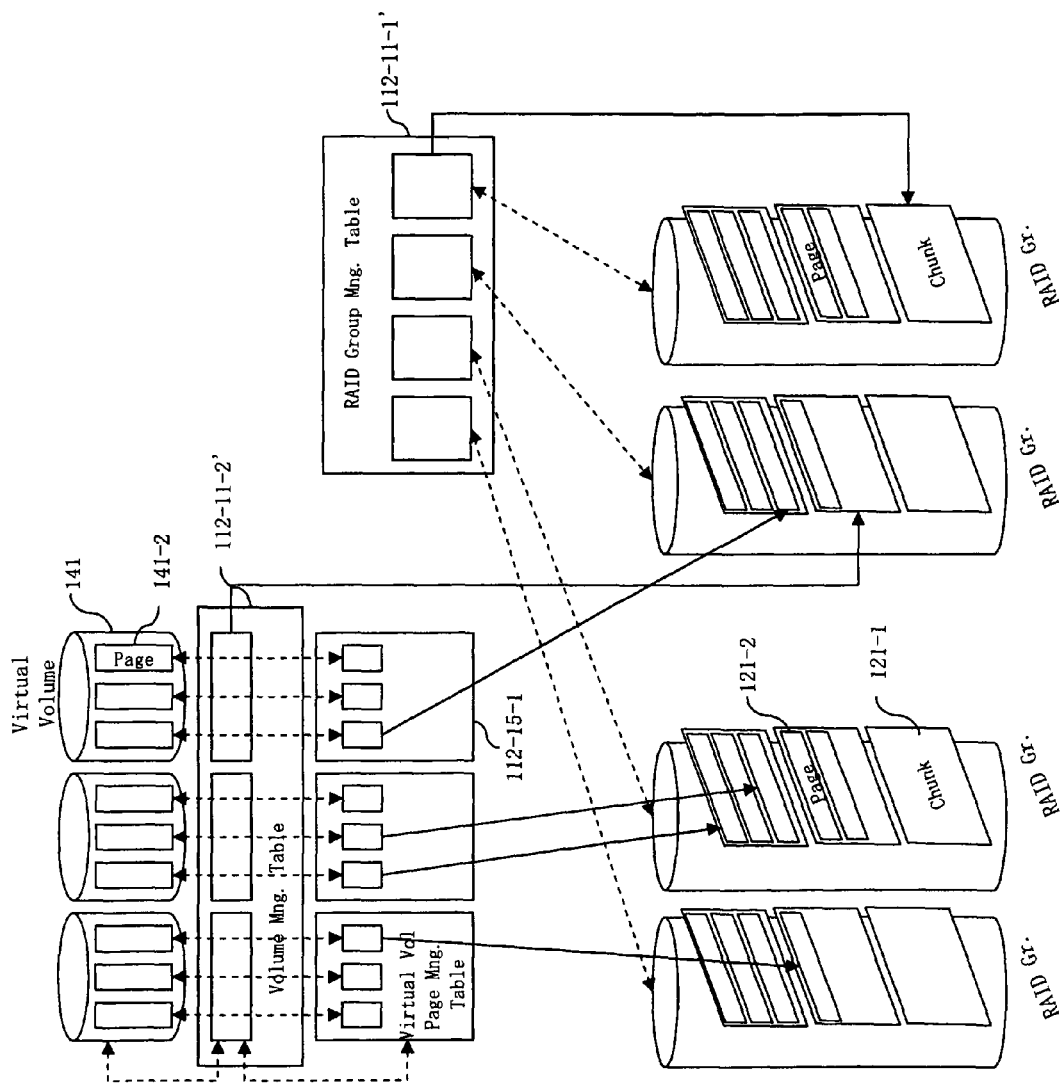
FIG. 33 shows an example of the virtual volume and its table structure according to the third embodiment.

FIG. 33 shows an example of the virtual volume and its table structure according to the third embodiment. The arrowed lines include solid lines and dashed lines. A solid line refers to an object refers by pointer. A dashed line refers to an object by calculation. For the virtual volume 141, the virtual volume 141 and the Virtual Volume Management Table 112-11-2' are on a one-to-one relation, and the Virtual Volume Management Table 112-11-2' refers to the current using Capacity Pool Pages 121-1. For the virtual volume page 141-2, the virtual volume page 141-2 and the Virtual Volume Page Management Table 112-15-1 are on a one-to-one relation, and the Virtual Volume Page Table 112-15-1 refers to a slice of Capacity Pool Pages 121-2, if a page is allocated. For the RAID group, the RAID group and RAID Group Management Table 112-11-1' are on a one-to-one relation, and the RAID Group Management Table 112-11-1' refers to used and unused capacity pool chunks 112-1.

Figure 34:
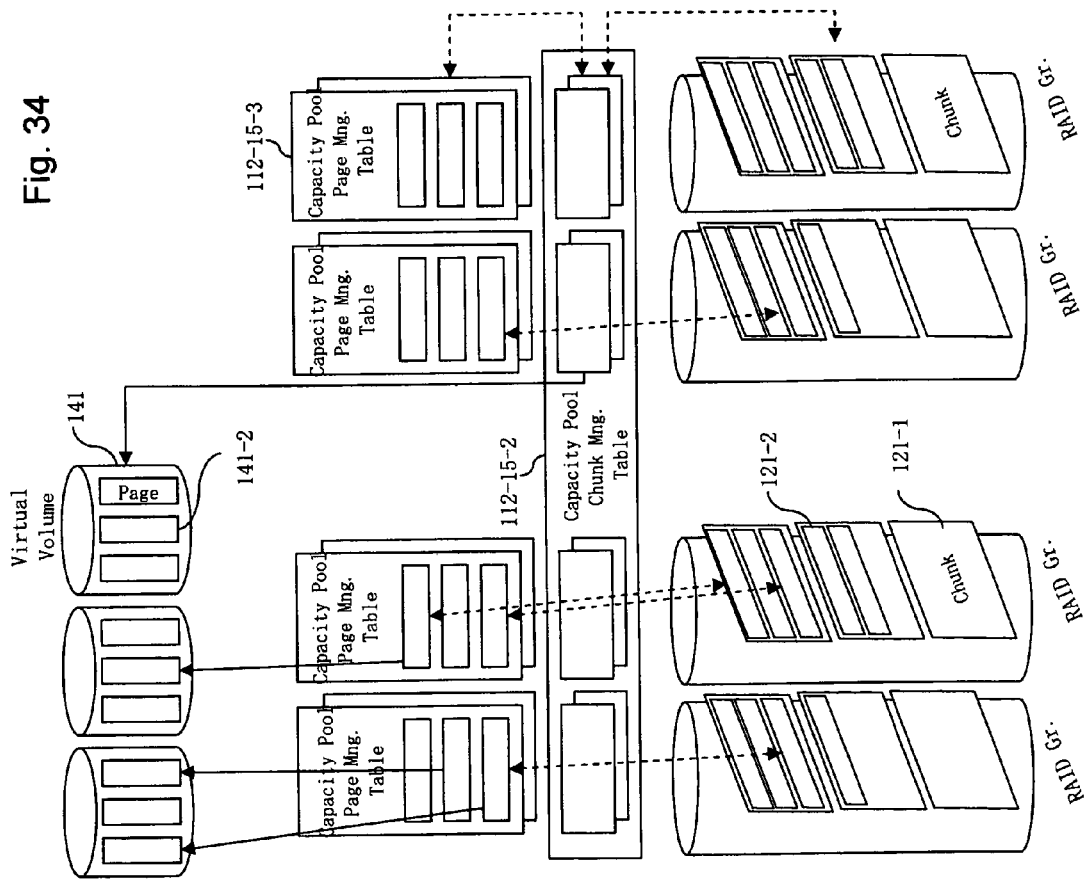
FIG. 34 shows an example of the table reference structure toward the capacity pool according to the third embodiment.

FIG. 34 shows an example of the table reference structure toward the capacity pool according to the third embodiment. For the arrowed lines, a solid line refers to an object by pointer and a dashed line refers to an object by calculation. For the capacity pool chunk 121-1, the capacity pool chunk 121-1 and the Capacity Pool Chunk Management Table 112-15-2 are on a one-to-one relation, and the Capacity Pool Chunk Management Table 112-15-2 refers to the virtual volume 141. For the capacity pool page 121-2, the Capacity Pool Page Management Table 112-15-3 refers to virtual volume page 141-2.

Figure 35:
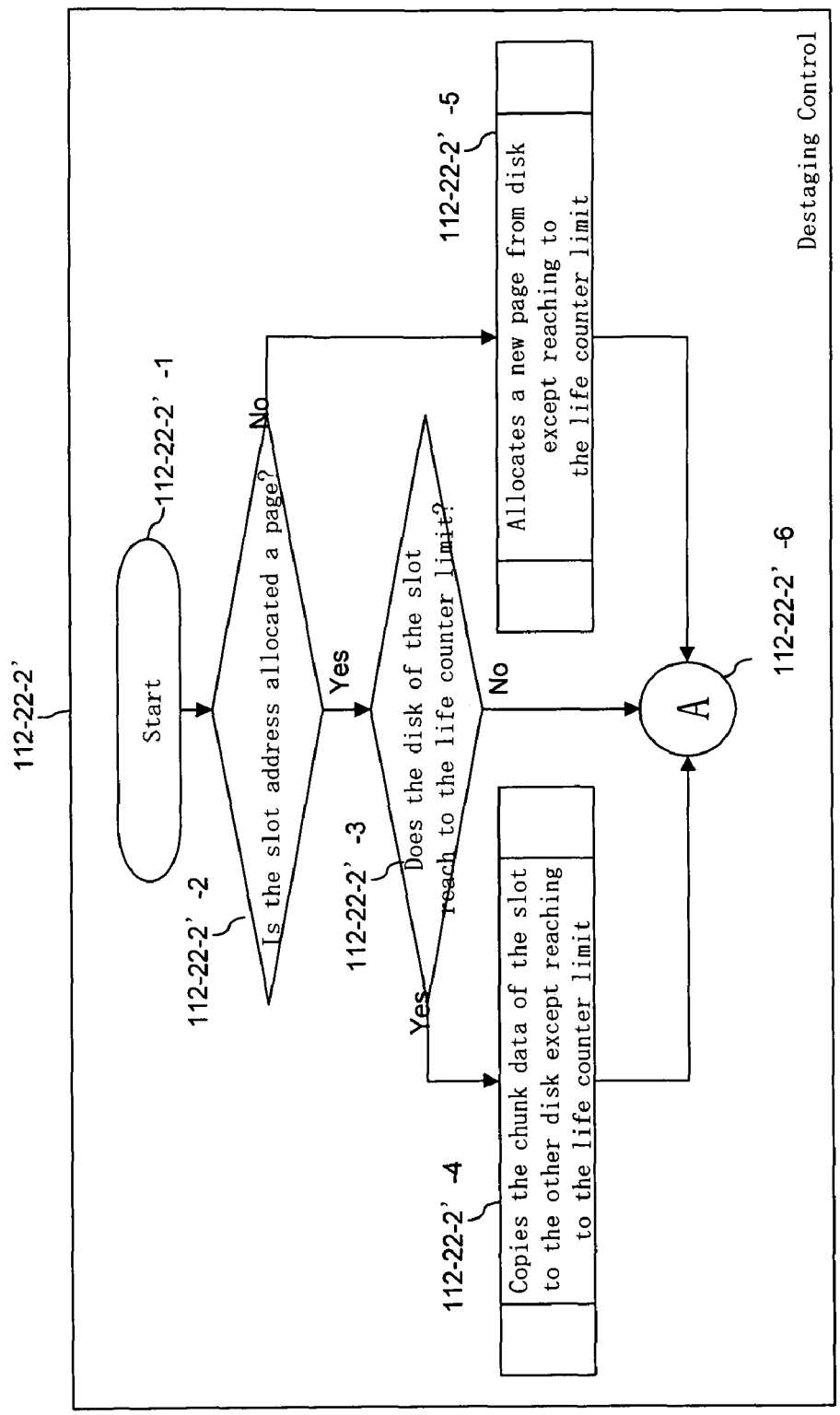
FIGS. 35 and 36 show an example of the process flow diagram for the Destaging Control according to the third embodiment.
Figure 36:
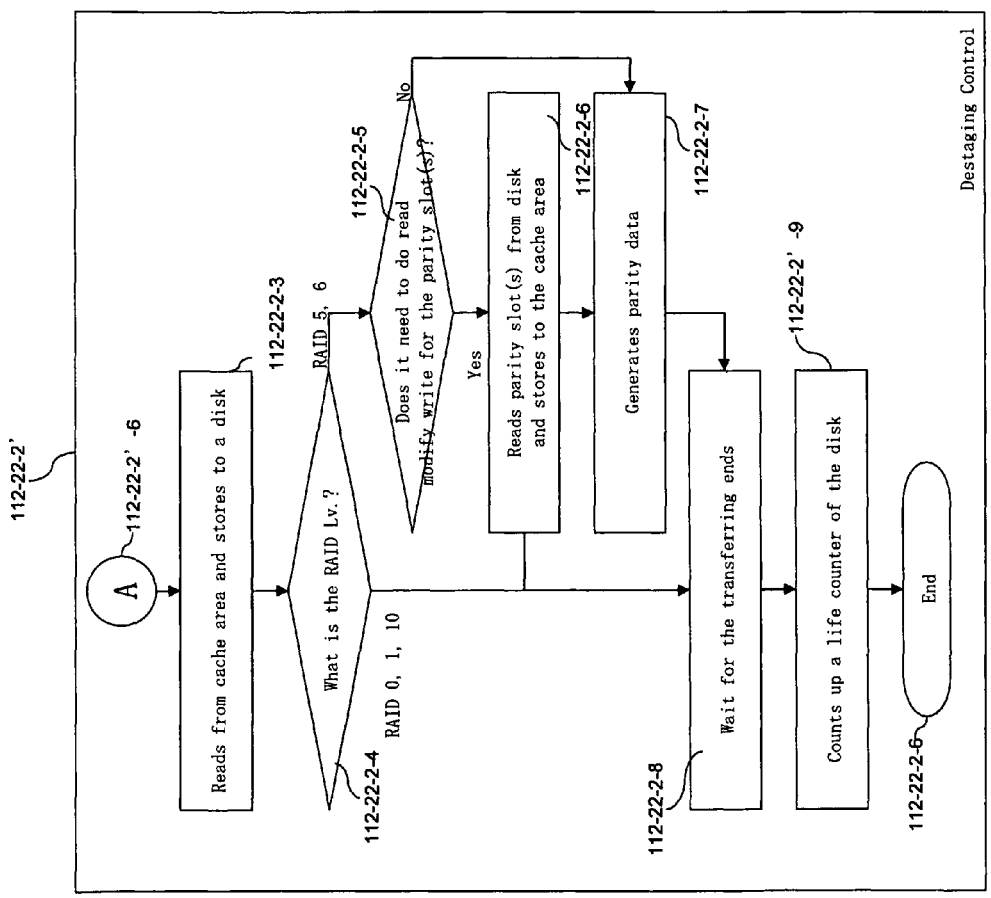

FIGS. 35 and 36 show an example of the process flow diagram for the Destaging Control 112-22-2' according to the third embodiment, starting at step 112-22-2'-1. New steps are added before Destaging Control 112-22-2 as compared to the second embodiment of FIG. 24. In step 112-22-2'-2, the program checks if a capacity pool page is allocated to the virtual volume page or not. If yes, in step 112-22-2'-3, the program checks if the disk(s) to which the capacity pool page belongs reaches the limit of life or not. If yes, in step 112-22-2'-4, the program allocates a new capacity pool page from a RAID Group which does not reach life limit, and copies from the using capacity pool page to the newly allocated page. The process continues to the destaging control at step 112-22-2'-6. If the result is no in step 112-22-2'-3, the process goes to step 112-22-2'-6. If the result is no in step 112-22-2'-2, in step 112-22-2'-5, the program allocates a new capacity pool page from a RAID group which does not reach life limit. The process then continues to the destaging control at step 112-22-2'-6.

Figure 37:
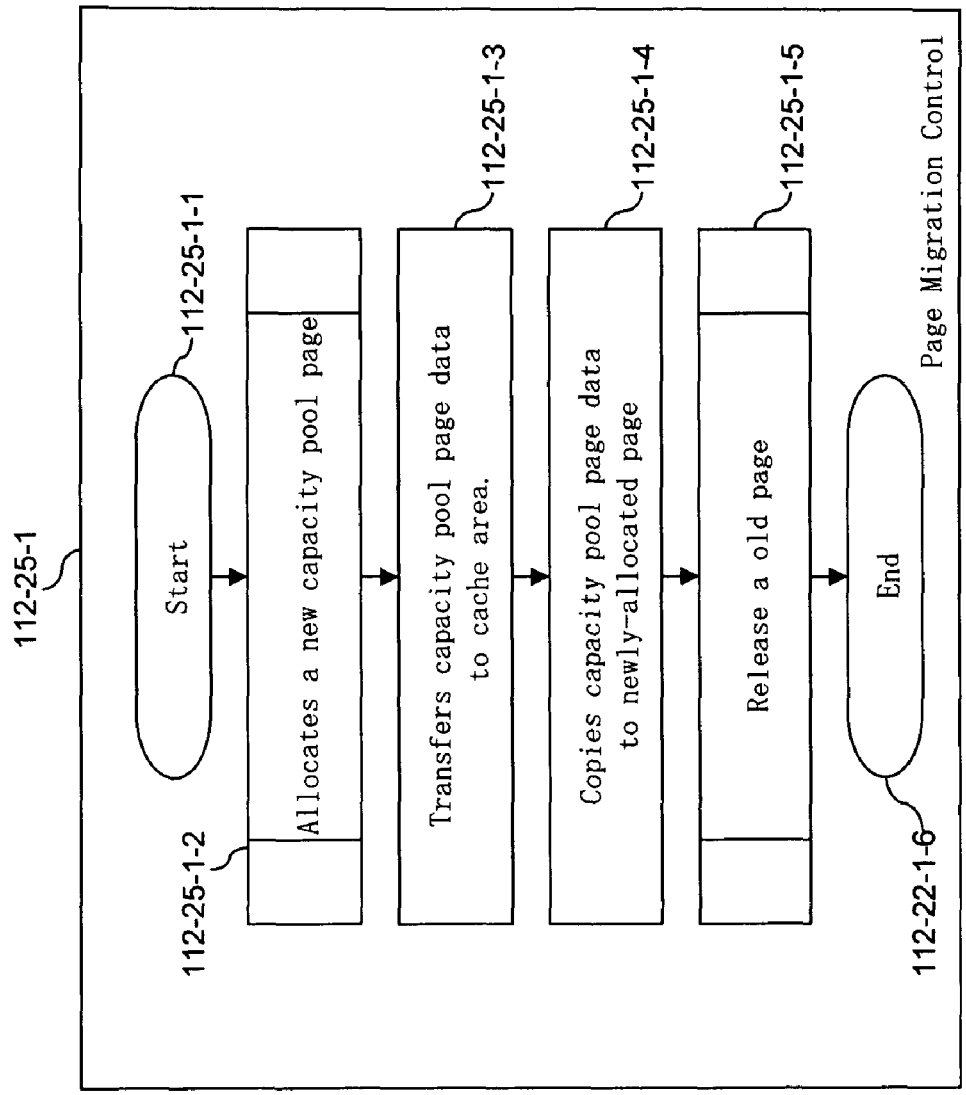
FIG. 37 shows an example of the process flow diagram for the Page Migration Control.

FIG. 37 shows an example of the process flow diagram for the Page Migration Control 112-25-1, starting at step 112-25-1-1. In step 112-25-1-2, the program allocates a new capacity pool page. In step 112-25-1-3, the program transfers the designated capacity pool page data from the disks and stores the data to the Cache Data Area 112-30. In step 112-25-1-4, the program copies the capacity pool page data to the newly allocated capacity pool page. In step 112-25-1-5, the program changes the reference of RAID Group Number 112-15-1-2 and Capacity Pool Page Index 112-15-1-3 to the newly added page, and releases the old (migrated) capacity pool page. The process ends at step 112-22-1-6.

Expression

Figure 38:
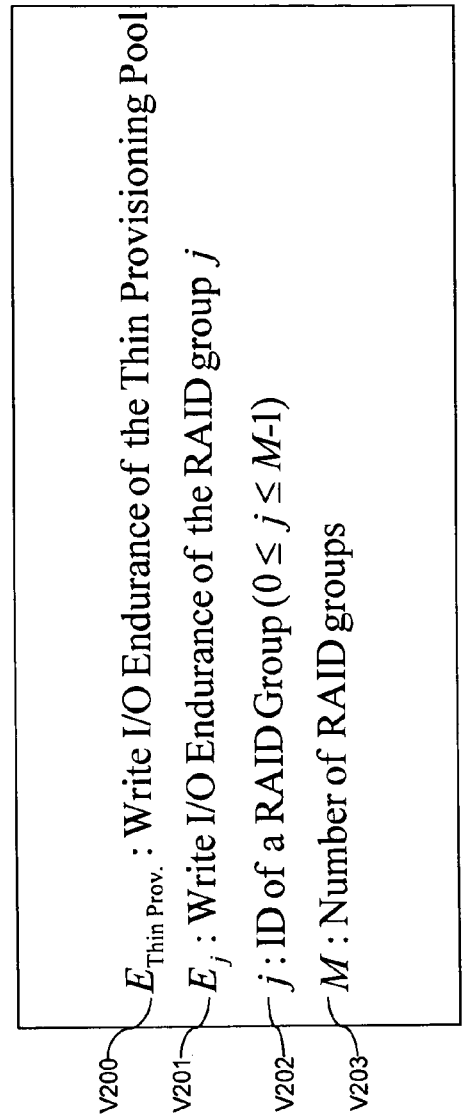
FIG. 38 shows an example of an expression to calculate the reliability at step 112-29-1-2 of FIG. 15 according to the third embodiment.

FIG. 38 shows an example of an expression to calculate the reliability at step 112-29-1-2 of FIG. 15 according to the third embodiment. This expression is based on the first embodiment of FIG. 20. The variable V200 expresses the remaining life of the thin provisioning pool. The variable V201 expresses the remaining life (i.e., write I/O endurance) $E_j$ of the jth RAID group which is a member of the thin provisioning pool in the sequential and random write I/O mixed environment. The remaining life $E_j$ of the jth RAID group is calculated using the formulas described above (FIGS. 20 and 25). The variable V202 expresses the ID of a RAID group. The variable V203 expresses the number of RAID groups in the thin provisioning pool. The expression E200 calculates the life of the thin provisioning pool which includes a plurality of RAID groups.

Fourth Embodiment

Only differences between the fourth embodiment and the third embodiment are described.

Figure 39:
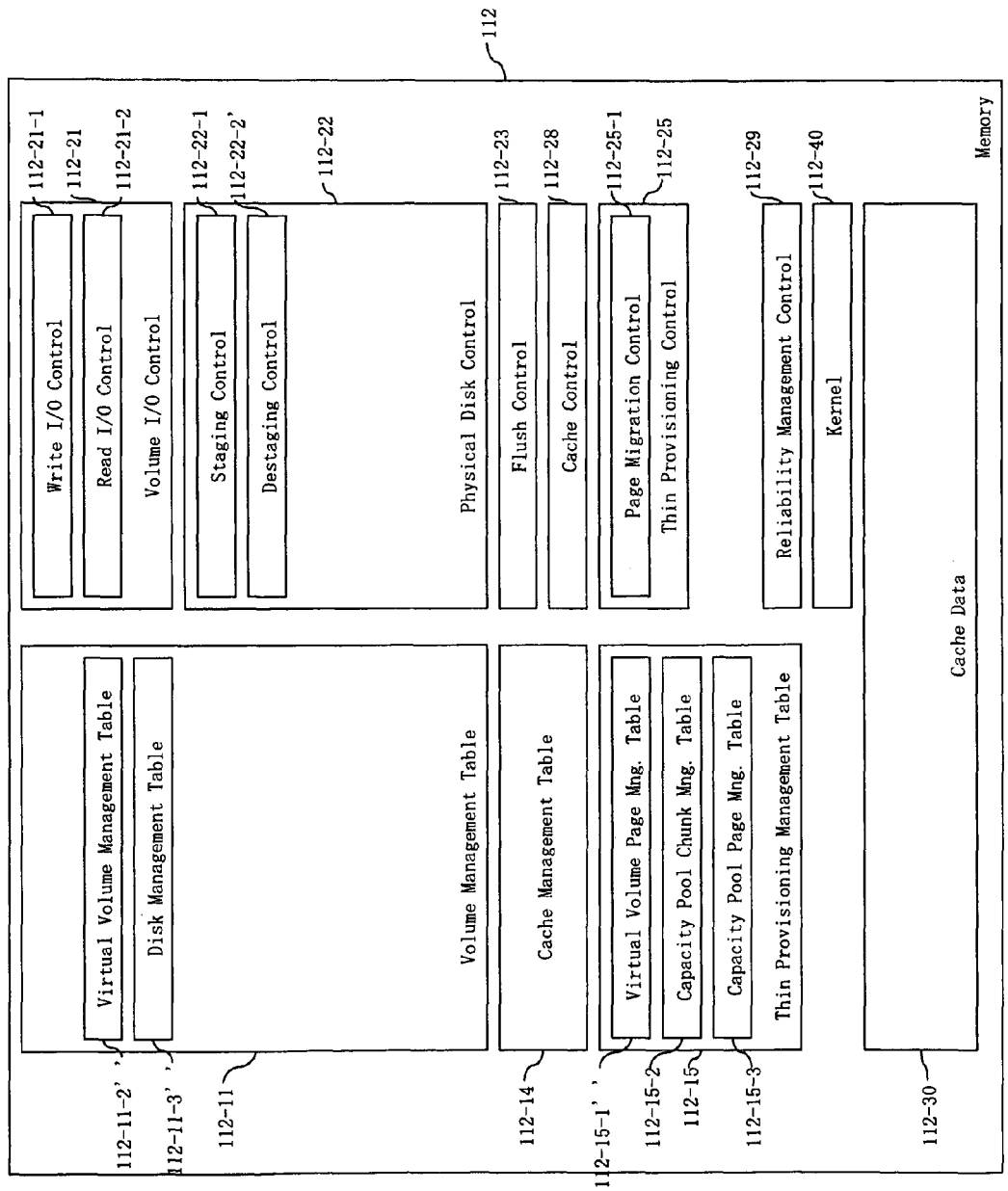
FIG. 39 shows an example of the memory in the storage subsystem according to a fourth embodiment of the invention.

FIG. 39 shows an example of the memory 112 in the storage subsystem according to a fourth embodiment of the invention. Three elements are replaced and one element (Migration Control 112-22-3) is deleted as compared to FIG. 27. The three new elements replacing the old are Virtual Volume Management Table 112-11-2", Disk Management Table 112-11-3", and Virtual Volume Page Management Table 112-15-1".

FIG. 40 shows an example of a Disk Management Table 112-11-3" according to the fourth embodiment. Two values are added to the table as compared to FIG. 5. The first is the Free Chunk Queue Index 112-11-3-5" for managing unused thin provisioning chunks. The second is the Used Chunk Queue Index 112-11-3-6" for managing used thin provisioning chunks.

FIG. 41 shows an example of a Virtual Volume Management Table 112-11-2" according to the fourth embodiment. As compared to FIG. 4, the Disk Number 112-11-2-3" in FIG. 41 provides the ID list of disks 121 that the virtual volume currently uses, and the Chunk Number 112-11-2-5" provides the ID list of capacity pool chunks belonging to a capacity pool that the virtual volume currently uses.

FIG. 42 shows an example of a Virtual Volume Page Management Table 112-15-1" according to the fourth embodiment. As compared to FIG. 30, the Disk Number 112-15-1-2" in FIG. 42 provides the ID list of disks 121 belonging to a capacity pool page to which the virtual volume page refers, the Capacity Pool Page 112-15-1-3" provides the ID list of address belonging to a capacity pool page to which the virtual volume page refers.

Figure 43:
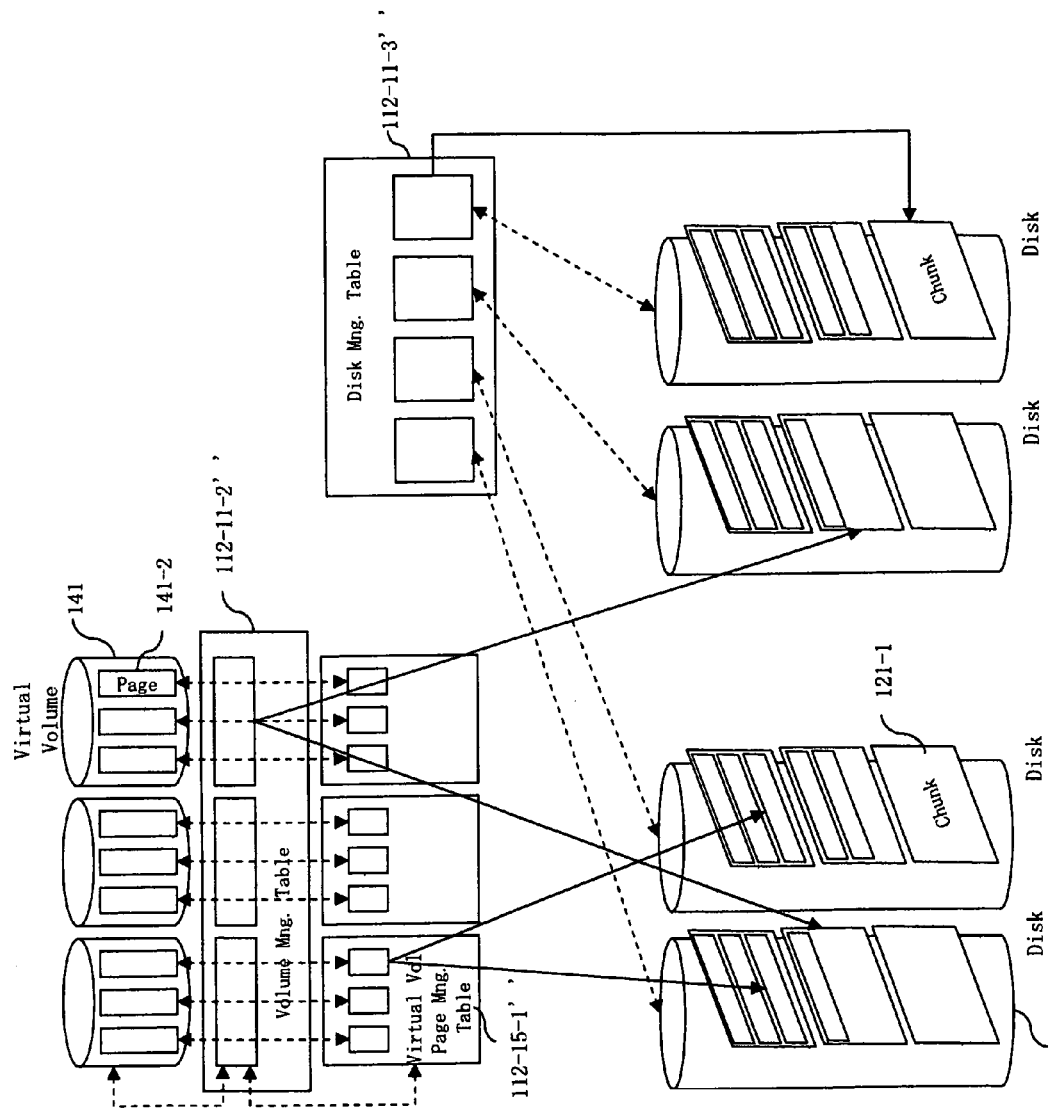
FIG. 43 shows an example of the virtual volume and its table structure according to the fourth embodiment.

FIG. 43 shows an example of the virtual volume and its table structure according to the fourth embodiment. A solid arrowed line refers to an object by pointer. A dashed arrowed line refers to an object by calculation. For the virtual volume 141, the virtual volume 141 and the Virtual Volume Management Table 112-11-2' are on a one-to-one relation, and the Virtual Volume Management Table 112-11-2' refers to the current using Capacity Pool Pages 121-1. For the virtual volume page 141-2, the virtual volume page 141-2 and the Virtual Volume Page Management Table 112-15-1 are on a one-to-one relation, and the Virtual Volume Page Table 112-15-1 refers to two (or more) slices of Capacity Pool Pages 121-2, if pages are allocated. The disks 121 and Disk Management Table 112-11-3" are on a one-to-one relation. The Disk Management Table 112-11-3" refers to used and unused Capacity Pool Chunks 112-1.

Figure 44:
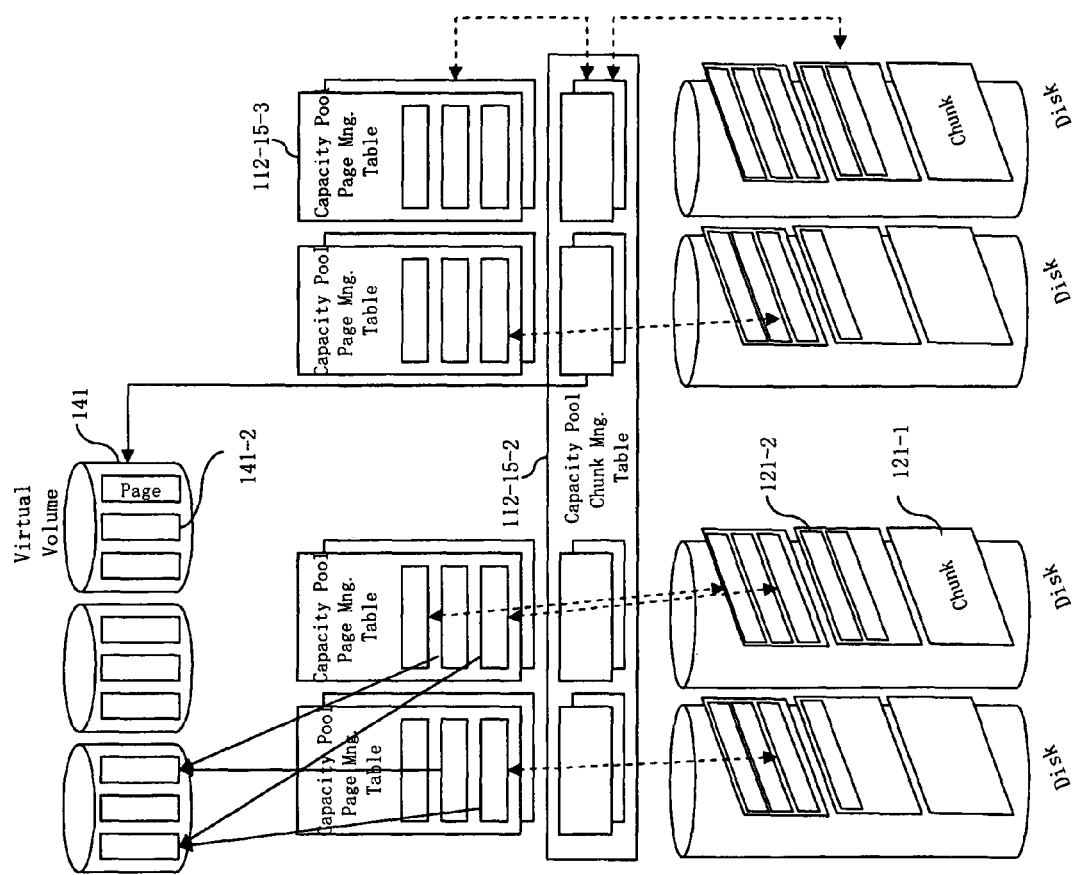
FIG. 44 shows an example of the table reference structure toward the capacity pool according to the fourth embodiment.

FIG. 44 shows an example of the table reference structure toward the capacity pool according to the fourth embodiment. For the arrowed lines, a solid line refers to an object by pointer and a dashed line refers to an object by calculation. For the capacity pool chunk 121-1, the capacity pool chunk 121-1 and the Capacity Pool Chunk Management Table 112-15-2 are on a one-to-one relation, and the Capacity Pool Chunk Management Table 112-15-2 refers to the virtual volume 141. For the capacity pool page 121-2, the Capacity Pool Page Management Table 112-15-3 refers to virtual volume page 141-2.

Expression

FIG. 45 shows an example of an expression to calculate the reliability at step 112-29-1-2 according to the fourth embodiment. The variable V212 expresses the ID of a disk. The variable V213 expresses the number of disks in the thin provisioning pool. The expression E210 calculates the life of the thin provisioning pool which includes a plurality of disks. In this case, the expression does not depend on the ratio of sequential to random write I/O types since it is for a RAID10 life.

Of course, the system configurations illustrated in FIGS. 1, 2, 27, and 39 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the management of availability and reliability of flash memory media. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of evaluating reliability of flash memory media, the method comprising:
measuring a flash memory remaining life for each disk of a plurality of flash memory media disks provided in one or more flash memory media groups each of which has a configuration and a relationship between the flash memory media group and the flash memory media disks in the flash memory media group, wherein each flash memory media group is one of a RAID group or a thin provisioning pool;
obtaining a ratio of sequential to random write I/O types for each flash memory media group; and
calculating a remaining life of each flash memory media group based on the measured flash memory remaining life for each disk in said each flash memory media group, the configuration of said each flash memory media group, the relationship between said each flash memory media group and the flash memory media disks in said each flash memory media group, and the ratio of sequential to random write I/O types for said each flash memory media group.

2. A method according to claim 1,
wherein measuring the flash memory remaining life for a disk comprises one of counting a number of sequential write operations and a number of random write operations to the disk or obtaining the flash memory remaining life from a sequential write counter and a random write counter in the disk.

3. A method according to claim 1,
wherein measuring the flash memory remaining life for a disk comprises obtaining the flash memory remaining life from a sequential write counter and a random write counter in the disk; and
wherein the calculating comprises calculating the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group at RAID level p in sequential write I/O type,
$E_{p/Rnd}$ is a write I/O endurance of the RAID group at RAID level p in random write I/O type,
i is an ID of a disk and i is an integer, $0 \leq i \leq N-1$,
N is a number of disks in the RAID group,
$\lambda_i$ is a remaining life of disk i, and
$\rho$ is a ratio of sequential to random write I/O type, $0 \leq \rho \leq 1$.

4. A method according to claim 3,
wherein the plurality of flash memory media disks are provided in one or more thin provisioning pools each having a plurality of RAID groups of disks; and
wherein the calculating comprises calculating the remaining life of each thin provisioning pool $E_{Thin\ Prov}$ as follows $$E_{Thin\ Prov} = \Sigma^{M-1}_{j=0} E_j$$

where
j is an ID of a RAID group of disks in the thin provisioning pool,
$E_j$ is a remaining life of the RAID group j using $E = \rho E_{p/Seq} + (1-\rho) E_{p/Rnd}$, and
M is the number of RAID groups in the thin provisioning pool.

5. A method according to claim 1,
wherein the measuring the flash memory remaining life for a disk comprises counting a number of sequential write operations and a number of random write operations to the disk; and
wherein the calculating comprises calculating the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group in sequential write I/O type,
$E_{p/Rnd}$ is a write I/O endurance of the RAID group in random write I/O type,
i is an ID of a disk and i is an integer, $0 \leq i \leq N-1$,
N is a number of disks in the RAID group,
$\rho$ is a ratio of sequential to random write I/O type, $0 \leq \rho \leq 1$,
$\lambda_i$ is a remaining life of disk i, and $\lambda_i = L_i - I_i$,
$L_i$ is a theoretical limit of a number of write times to disk i, and
$I_i$ is one of the number of sequential write operations for disk i to be used for calculating the write I/O endurance in sequential write I/O type, or the number of random write operations for disk i to be used for calculating the write I/O endurance in random write I/O type.

6. A method according to claim 1,
wherein the plurality of flash memory media disks are provided in one or more thin provisioning pools each having a plurality of disks; and
wherein the calculating comprises calculating the remaining life of the thin provisioning pool $E_{Thin\ Prov}$ as follows $$E_{Thin\ Prov} = (1/2) \Sigma^{P}_{i=1} (\lambda_i)$$

where
i is an ID of a disk,
$\lambda_i$ is a remaining life of disk i, and
P is the number of disks in the thin provisioning pool.

7. A system of evaluating reliability of flash memory media, the system comprising:
a plurality of flash memory media disks which are provided in one or more flash memory media groups each of which has a configuration and a relationship between the flash memory media group and the flash memory media disks in the flash memory media group, wherein each flash memory media group is one of a RAID group or a thin provisioning pool;
a memory storing data and one or more modules;
a processor executing the one or more modules to
measure a flash memory remaining life for each disk of the plurality of flash memory media disks;
obtain a ratio of sequential to random write I/O types for each flash memory media group; and
calculate a remaining life of each flash memory media group based on the measured flash memory remaining life for each disk in said each flash memory media group, the configuration of said each flash memory media group, the relationship between said each flash memory media group and the lash memory media disks in said each flash memory media group, and the ratio of sequential to random write I/O types for said each flash memory media group.

8. A system according to claim 7,
wherein the flash memory remaining life for a disk is measured by one of counting a number of sequential write operations and a number of random write operations to the disk or obtaining the flash memory remaining life from a sequential write counter and a random write counter in the disk.

9. A system according to claim 7,
wherein the flash memory remaining life for a disk is measured by obtaining the flash memory remaining life from a sequential write counter and a random write counter in the disk; and
wherein the remaining life of a RAID group of disks E is calculated as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group at RAID level p in sequential write I/O type,
$E_{p/Rnd}$ is a write I/O endurance of the RAID group at RAID level p in random write I/O type,
i is an ID of a disk and i is an integer, $0 \leq i \leq N-1$,
N is a number of disks in the RAID group,
$\lambda_i$ is a remaining life of disk i, and
$\rho$ is a ratio of sequential to random write I/O type, $0 \leq \rho \leq 1$.

10. A system according to claim 9,
wherein the plurality of flash memory media disks are provided in one or more thin provisioning pools each having a plurality of RAID groups of disks; and
wherein the remaining life of each thin provisioning pool $E_{Thin\ Prov}$ is calculated as follows $$E_{Thin\ Prov} = \Sigma^{M-1}_{j=0} E_j$$

where
j is an ID of a RAID group of disks in the thin provisioning pool,
$E_j$ is a remaining life of the RAID group j using $E = \rho E_{p/Seq} + (1-\rho) E_{p/Rnd}$, and
M is the number of RAID groups in the thin provisioning pool.

11. A system according to claim 7,
wherein the flash memory remaining life for a disk is measured by counting a number of sequential write operations and a number of random write operations to each disk of the plurality of flash memory media disks; and
wherein the remaining life of a RAID group of disks E is calculated as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group in sequential write I/O type,
$E_{p/Rnd}$ is a write I/O endurance of the RAID group in random write I/O type,
i is an ID of a disk and i is an integer, $0 \leq i \leq N-1$,
N is a number of disks in the RAID group,
$\rho$ is a ratio of sequential to random write I/O type, $0 \leq \rho \leq 1$,
$\lambda_i$ is a remaining life of disk i, and $\lambda_i = L_i - I_i$,
$L_i$ is a theoretical limit of a number of write times to disk i, and
$I_i$ is one of the number of sequential write operations for disk i to be used for calculating the write I/O endurance in sequential write I/O type, or the number of random write operations for disk i to be used for calculating the write I/O endurance in random write I/O type.

12. A system according to claim 7,
wherein the plurality of flash memory media disks are provided in one or more thin provisioning pools each having a plurality of disks; and
wherein the remaining life of the thin provisioning pool $E_{Thin\ Prov}$ is calculated as follows $$E_{Thin\ Prov} = (1/2) \Sigma^P_{i=1}(\lambda_i)$$

where
i is an ID of a disk,
$\lambda_i$ is a remaining life of disk i, and
P is the number of disks in the thin provisioning pool.

13. A computer-readable storage medium storing a plurality of instructions for controlling a data processor to evaluate reliability of flash memory media, the plurality of instructions comprising:
instructions that cause the data processor to measure a flash memory remaining life for each disk of a plurality of flash memory media disks provided in one or more flash memory media groups each of which has a configuration and a relationship between the flash memory media group and the flash memory media disks in the flash memory media group, wherein each flash memory media group is one of a RAID group or a thin provisioning pool;
instructions that cause the data processor to obtain a ratio of sequential to random write I/O types for each flash memory media group; and
instructions that cause the data processor to calculate a remaining life of each flash memory media group based on the measured flash memory remaining life for each disk in said each flash memory media group, the configuration of said each flash memory media group, the relationship between said each flash memory media group and the flash memory media disks in the said each flash memory media group, and the ratio of sequential to random write I/O types for said each flash memory media group.

14. A computer-readable storage medium according to claim 13,
wherein the instructions that cause the data processor to measure the flash memory remaining life for a disk comprise instructions that cause the data processor to perform one of counting a number of sequential write operations and a number of random write operations to the disk or obtaining the flash memory remaining life from a sequential write counter and a random write counter in the disk.

15. A computer-readable storage medium according to claim 13,
wherein the flash memory remaining life for a disk is measured by obtaining the flash memory remaining life from a sequential write counter and a random write counter in the disk; and
wherein the instructions that cause the data processor to calculate include instructions that cause the data processor to calculate the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group at RAID level p in sequential write I/O type,
$E_{p/Rnd}$ is a write I/O endurance of the RAID group at RAID level p in random write I/O type,
i is an ID of a disk and i is an integer, $0 \leq i \leq N-1$,
N is a number of disks in the RAID group,
$\lambda_i$ is a remaining life of disk i, and
$\rho$ is a ratio of sequential to random write I/O type, $0 \leq \rho \leq 1$.

16. A computer-readable storage medium according to claim 15,
wherein the plurality of flash memory media disks are provided in one or more thin provisioning pools each having a plurality of RAID groups of disks; and
wherein the instructions that cause the data processor to calculate comprise instructions that cause the data processor to calculate the remaining life of each thin provisioning pool $E_{Thin\,Prov}$ as follows $$E_{Thin\,Prov} = \Sigma^{M-1}_{j=0} E_j$$

where
j is an ID of a RAID group of disks in the thin provisioning pool,
$E_j$ is a remaining life of the RAID group j using $E = \rho E_{p/Seq} + (1-\rho) E_{p/Rnd}$, and
M is the number of RAID groups in the thin provisioning pool.

17. A computer-readable storage medium according to claim 13,
wherein the flash memory remaining life for a disk is measured by counting a number of sequential write operations and a number of random write operations to the disk; and
wherein the instructions that cause the data processor to calculate comprise instructions that cause the data processor to calculate the remaining life of a RAID group of disks E as follows:

$$E = \rho E_{p/Seq} + (1-\rho) E_{p/Rnd}$$

where $$E_{RAID10/Seq} = (N/2) \min(\lambda_{i=[0,N-1]}),$$

$$E_{RAID10/Rnd} = (N/2) \min(\lambda_{i=[0,N-1]}),$$

$$E_{RAID5/Seq} = (N-1) \min(\lambda_{i=[0,N-1]}),$$

$$E_{RAID5/Rnd} = (N/2) \min(\lambda_{i=[0,N-1]}),$$

$$E_{RAID6/Seq} = (N-2) \min(\lambda_{i=[0,N-1]}),$$

$$E_{RAID6/Rnd} = (N/3) \min(\lambda_{i=[0,N-1]}),$$

p is a RAID level of the RAID group of disks,
Seq is sequential write I/O type,
Rnd is random write I/O type,
$E_{p/Seq}$ is a write I/O endurance of the RAID group in sequential write I/O type,
$E_{p/Rnd}$ is a write I/O endurance of the RAID group in random write I/O type,
i is an ID of a disk and i is an integer, $0 \leq i \leq N-1$,
N is a number of disks in the RAID group,
$\rho$ is a ratio of sequential to random write I/O type, $0 \leq \rho \leq 1$,
$\lambda_i$ is a remaining life of disk i, and $\lambda_i \equiv L_i - I_i$,
$L_i$ is a theoretical limit of a number of write times to disk i, and
$I_i$ is one of the number of sequential write operations for disk i to be used for calculating the write I/O endurance in sequential write I/O type, or the number of random write operations for disk i to be used for calculating the write I/O endurance in random write I/O type.

18. A computer-readable storage medium according to claim 13,
wherein the plurality of flash memory media disks are provided in one or more thin provisioning pools each having a plurality of disks; and
wherein the instructions that cause the data processor to calculate comprise instructions that cause the data processor to calculate the remaining life of the thin provisioning pool $E_{Thin\,Prov}$ as follows $$E_{Thin\,Prov} = (1/2) \Sigma^{P}_{i=1}(\lambda_i)$$

where
i is an ID of a disk,
$\lambda_i$ is a remaining life of disk i, and
P is the number of disks in the thin provisioning pool.

19. A method according to claim 1,
wherein if the flash memory media group is a RAID group, the relationship between the RAID group and the flash memory media disks in the RAID group includes IDs of the disks in the RAID group and a number of the disks in the RAID group; and
wherein if the flash memory media group is a thin provisioning pool, the relationship between the thin provisioning pool and the flash memory disks in the thin provisioning pool includes IDs of the disks in the thin provisioning pool and a number of the disks in the thin provisioning pool.

20. A system according to claim 7,
wherein if the flash memory media group is a RAID group, the relationship between the RAID group and the flash memory media disks in the RAID group includes IDs of the disks in the RAID group and a number of the disks in the RAID group; and wherein if the flash memory media group is a thin provisioning pool, the relationship between the thin provisioning pool and the flash memory disks in the thin provisioning pool includes IDs of the disks in the thin provisioning pool and a number of the disks in the thin provisioning pool.

* * * * *